United States Patent
Sauder et al.

(10) Patent No.: US 7,497,174 B2
(45) Date of Patent: Mar. 3, 2009

(54) PLANTER BRACKET ASSEMBLY FOR SUPPORTING APPURTENANCES IN SUBSTANTIAL ALIGNMENT WITH THE SEED TUBE

(75) Inventors: Derek A. Sauder, Tremont, IL (US); Chad Plattner, Tremont, IL (US)

(73) Assignee: Precision Planting, Inc., Tremont, IL (US)

( * ) Notice: Subject to any disclaimer, the term of this patent is extended or adjusted under 35 U.S.C. 154(b) by 405 days.

(21) Appl. No.: 11/160,898

(22) Filed: Jul. 14, 2005

(65) Prior Publication Data

US 2005/0241554 A1    Nov. 3, 2005

Related U.S. Application Data

(63) Continuation-in-part of application No. 10/666,108, filed on Sep. 18, 2003, now Pat. No. 6,918,342.

(51) Int. Cl.
| A01C 5/00 | (2006.01) |
| A01C 7/00 | (2006.01) |
| A01C 9/00 | (2006.01) |
| A01C 13/00 | (2006.01) |
| A01C 23/00 | (2006.01) |

(52) U.S. Cl. .................. 111/121; 111/127; 111/129; 111/163; 111/187; 111/188; 111/197

(58) Field of Classification Search ......... 111/118–129, 111/170–190, 197
See application file for complete search history.

(56) References Cited

U.S. PATENT DOCUMENTS

| 221,004 | A | 10/1879 | Strayer |
| 252,265 | A | 1/1882 | Scofield |
| 410,438 | A | 9/1889 | Patric et al. |
| 889,947 | A | 6/1908 | Miller |
| 909,137 | A | 1/1909 | Bellerive |
| 2,533,374 | A | 12/1950 | Hyland |
| 2,771,044 | A | 11/1956 | Putifer |
| 2,872,883 | A | 2/1959 | Padrick |
| 3,308,775 | A | 3/1967 | Klene |
| 4,253,412 | A | 3/1981 | Hogenson |
| 4,307,674 | A | 12/1981 | Jennings et al. |

(Continued)

FOREIGN PATENT DOCUMENTS

DE    3114791 A1    10/1982

(Continued)

OTHER PUBLICATIONS

Precision Planting, Inc.—Brochure entitled "Keeton Seed Firmer Consistent Performance. Consistent Germination." (4 pages), date unknown.

(Continued)

*Primary Examiner*—Christopher J. Novosad
(74) *Attorney, Agent, or Firm*—Larkin Hoffman Daly & Lindgren Ltd.; Thomas J. Oppold

(57) ABSTRACT

A bracket assembly for supporting seed planting appurtenances in substantial alignment with respect to a seed tube of an agricultural planter. The bracket assembly includes a shaft mount and a shank mount.

13 Claims, 16 Drawing Sheets

U.S. PATENT DOCUMENTS

| | | |
|---|---|---|
| 5,092,255 A | 3/1992 | Long et al. |
| 5,271,343 A | 12/1993 | House |
| 5,425,318 A | 6/1995 | Keeton |
| 5,490,470 A | 2/1996 | House |
| 5,494,339 A | 2/1996 | Johnson et al. |
| 5,598,795 A | 2/1997 | House |
| 5,640,915 A | 6/1997 | Schaffert |
| 5,673,638 A | 10/1997 | Keeton |
| 5,730,074 A | 3/1998 | Peter |
| 5,852,982 A | 12/1998 | Peter |
| 5,918,557 A | 7/1999 | Schaffert |
| 6,082,275 A | 7/2000 | Schaffert |
| 6,209,466 B1 | 4/2001 | Wodrich |
| 6,216,615 B1 | 4/2001 | Romans |
| 6,283,050 B1 | 9/2001 | Schaffert |
| 6,918,342 B2 | 7/2005 | Sauder et al. |

FOREIGN PATENT DOCUMENTS

| | | | |
|---|---|---|---|
| DE | 3321490 A1 | 12/1984 |
| DE | 3441610 A1 | 5/1986 |

OTHER PUBLICATIONS

Precision Planting, Inc.—"Mounting Instructions for Keeton Gold Extra" (3 pages), date unknown.

Great Plains Manufacturing, Inc.—brochure entitled "Precision Seeding System" (4 pages), date unknown.

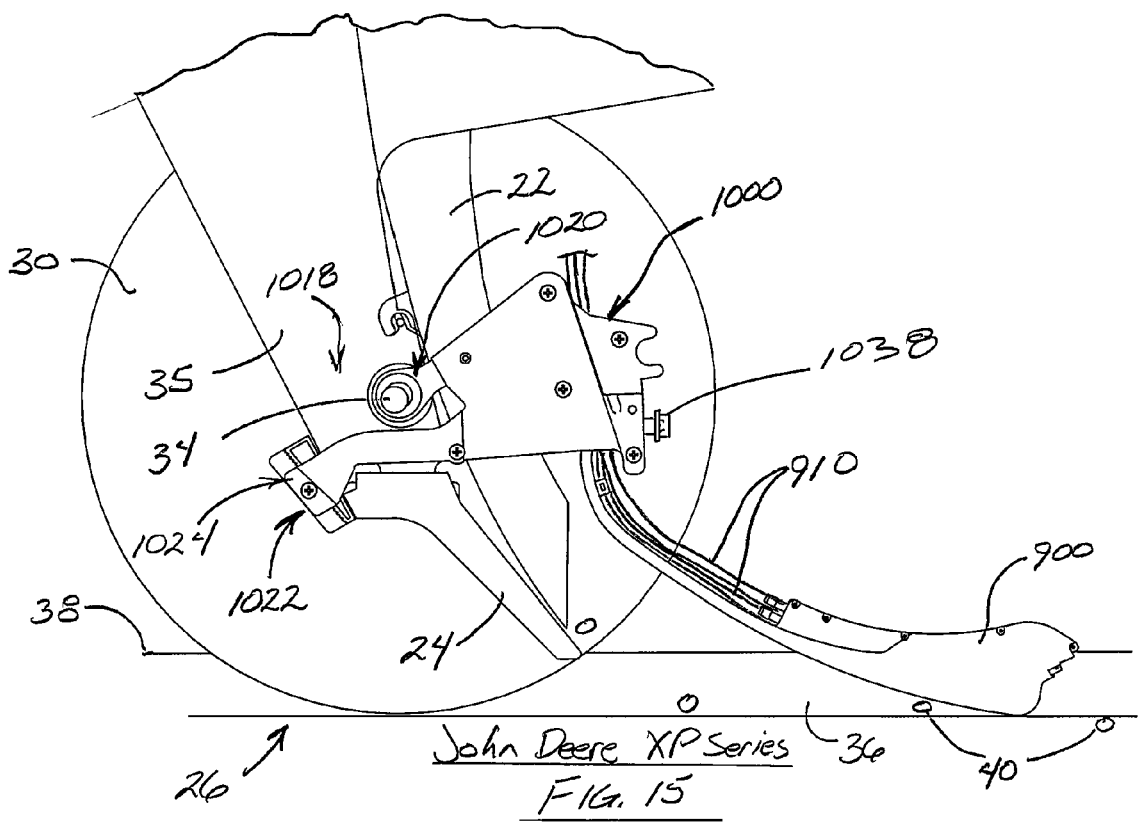
FIG. 15 John Deere XP Series
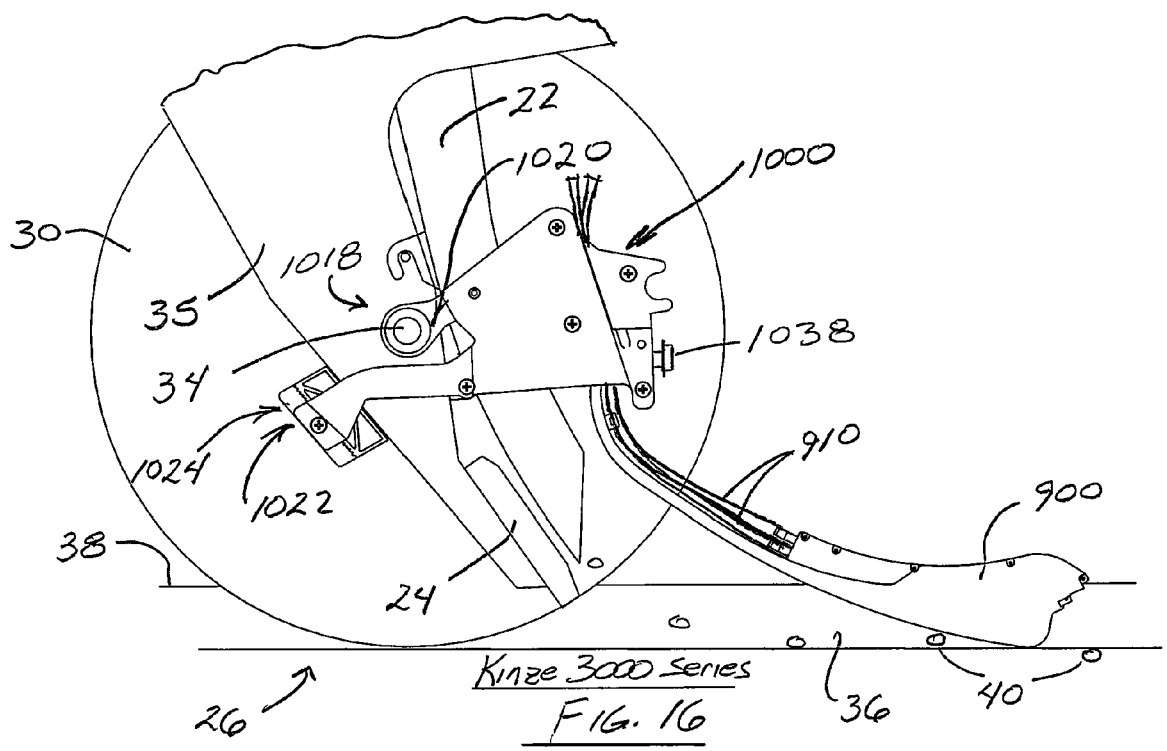
FIG. 16 Kinze 3000 Series

PLANTER BRACKET ASSEMBLY FOR SUPPORTING APPURTENANCES IN SUBSTANTIAL ALIGNMENT WITH THE SEED TUBE

CROSS REFERENCE TO RELATED APPLICATIONS

This application is a continuation-in-part of U.S. patent application Ser. No. 10/666,108 filed Sep. 18, 2003, now U.S. Pat. No. 6,918,342.

BACKGROUND OF THE INVENTION

In recent years, farmers have begun to recognize and appreciate the importance of ensuring accurate and consistent spacing of seeds in the furrow to improve crop yields. To ensure more accurate in-furrow seed placement, farmers have begun attaching various types of tools or appurtenances, such as seed deflectors and seed firmers, to the seed tube of the planter to minimize in-furrow seed bounce or roll.

Examples of various types of seed deflectors adapted to be mounted directly to the seed tube are disclosed in U.S. Pat. No. 2,533,374 issued to Hyland; U.S. Pat. No. 5,092,255 issued to Long et al.; and U.S. Pat. No. 6,283,050 issued to Schaffert. Examples of various types of seed firmers adapted to be secured directly to the seed tube are disclosed in U.S. Pat. Nos. 5,425,318 and 5,673,638 issued to Eugene G. Keeton, commercial embodiments of which, known as the Keeton™ seed firmers, are manufactured and distributed by Precision Planting, Inc., 23207 Townline Road, Tremont, Ill. 61568. The specifications and drawings of each of the above-identified patents are incorporated herein in their entirety by reference and such seed deflectors and seed firmers are collectively referred to hereinafter as "resilient tools."

Attaching resilient tools directly to the seed tube, is often time consuming and difficult due to the confined space. Furthermore, attaching resilient tools directly to the seed tube can place undue stress on the seed tube if the resilient tool makes soil contact during planting operations. Resilient tools, such as the Keeton™ firmer, for example are particularly designed to contact the bottom of the bottom of the seed furrow to embed the seed into the soil as the firmer passes over the seed. While embedding the seed into the soil ensures more seed-to-soil contact resulting in more consistent and uniform seed germination, if the resilient tool is attached directly to the seed tube, the necessary force exerted by the resilient tool required to embed the seeds often places stress on the seed tube.

To avoid stress on the seed tube during planting operations when using a resilient tool, such as the Keeton™ seed firmer, for example, Precision Planting, Inc., developed two different styles of bracket assemblies as shown in FIGS. 2 and 3 for attaching the resilient tool operably to the planter frame as opposed to the seed tube. The two different styles were designed to accommodate the different planter styles and configurations. For example, the bracket assembly style shown in FIG. 2, is adapted for use with all John Deere planters and Kinze planters prior to the 3000 series and is designed to attach to the transverse shaft of the furrow opening discs and to the seed tube guard. The bracket assembly of FIG. 3, is particularly adapted for use on all Kinze planters and John Deere 7000 series planters and is designed to mount to the row unit frame rearwardly of, but in substantial alignment with, the seed tube. Thus, both bracket assemblies of FIGS. 2 and 3 firmly support the resilient tool in substantial alignment with the seed tube operably from the planter frame such that no stress is exerted on the seed tube by the resilient tool during planting operations.

Furthermore, as shown in FIGS. 2 and 3, in response to increase farmer demand resulting from the advent of new liquid fertilizers developed for application directly into the seed furrow, Precision Planting, Inc. adapted the bracket assemblies to support liquid conduits for in-furrow liquid application. However, as shown in FIGS. 2 and 3, the present bracket assemblies cause sharp bends in the liquid applicator tubes. It has been found that sharp bends in the applicator tubes may cause restriction in the flow of the liquid fertilizers, and, over time, the liquid fertilizers can congeal at these sharp bends, further restricting the flow through the liquid applicator tubes.

Furthermore, at least with respect to the bracket assembly of FIG. 2, it has been found that the mounting ears that attach the bracket assembly to the axle of the furrow opening discs, which are made of thermoplastic material, may eventually wear, break or tear after extended periods of use, requiring replacement of the bracket assembly.

Accordingly, there is a need for an improved bracket assembly that overcomes the problems and disadvantages of existing bracket assemblies, but which is relatively inexpensive to manufacture and which offers the ability to support a variety of appurtenances.

Furthermore, because the planter structure will often vary from manufacture to manufacturer and between manufacturer models, it is desirable to provide a bracket assembly that may be adapted for use with most planters.

SUMMARY OF THE INVENTION

The present invention is directed toward a bracket assembly for supporting seed planting appurtenances in substantial alignment with respect to a seed tube of an agricultural planter. In one embodiment, the bracket assembly comprises a housing having opposing first and second sides. The housing includes mounting structure for rigidly securing the housing operably with respect to the planter frame. The sides of the housing further include interior walls for maintaining the sides of the housing in spaced apart relation. The housing may support various appurtenances alone or in combination, including a resilient tool, a liquid conduit, and a support arm for supporting any number of desired conduits all in substantial alignment with the seed tube.

In another embodiment, the bracket assembly includes a shaft mount, a shank mount and a housing adapted to operably support one or more seed planting appurtenances in substantial alignment with the seed tube. In a preferred embodiment, the shank mount includes both a forward shank-engaging mount and a rearward shank-engaging mount thereby providing a more universal bracket adaptable for use with most planters.

The various embodiment of the improved bracket assemblies of the present invention are illustrated in the accompanying drawings, attention being called to the fact, however, that the drawings are illustrative only, and that changes may be made in the specific form illustrated and described without materially departing from the teachings herein.

BRIEF DESCRIPTION OF THE DRAWINGS

FIG. 15 is a side elevation view illustrating another embodiment of a bracket assembly of the present invention disposed on and adapted for use with the furrow opening assembly of a John Deere XP series planter.

FIG. 16 is a side elevation view illustrating another embodiment of a bracket assembly of the present invention disposed on and adapted for use with the furrow opening assembly of a Kinze 3000 series planter.

DETAILED DESCRIPTION OF THE INVENTION

Figure 1:
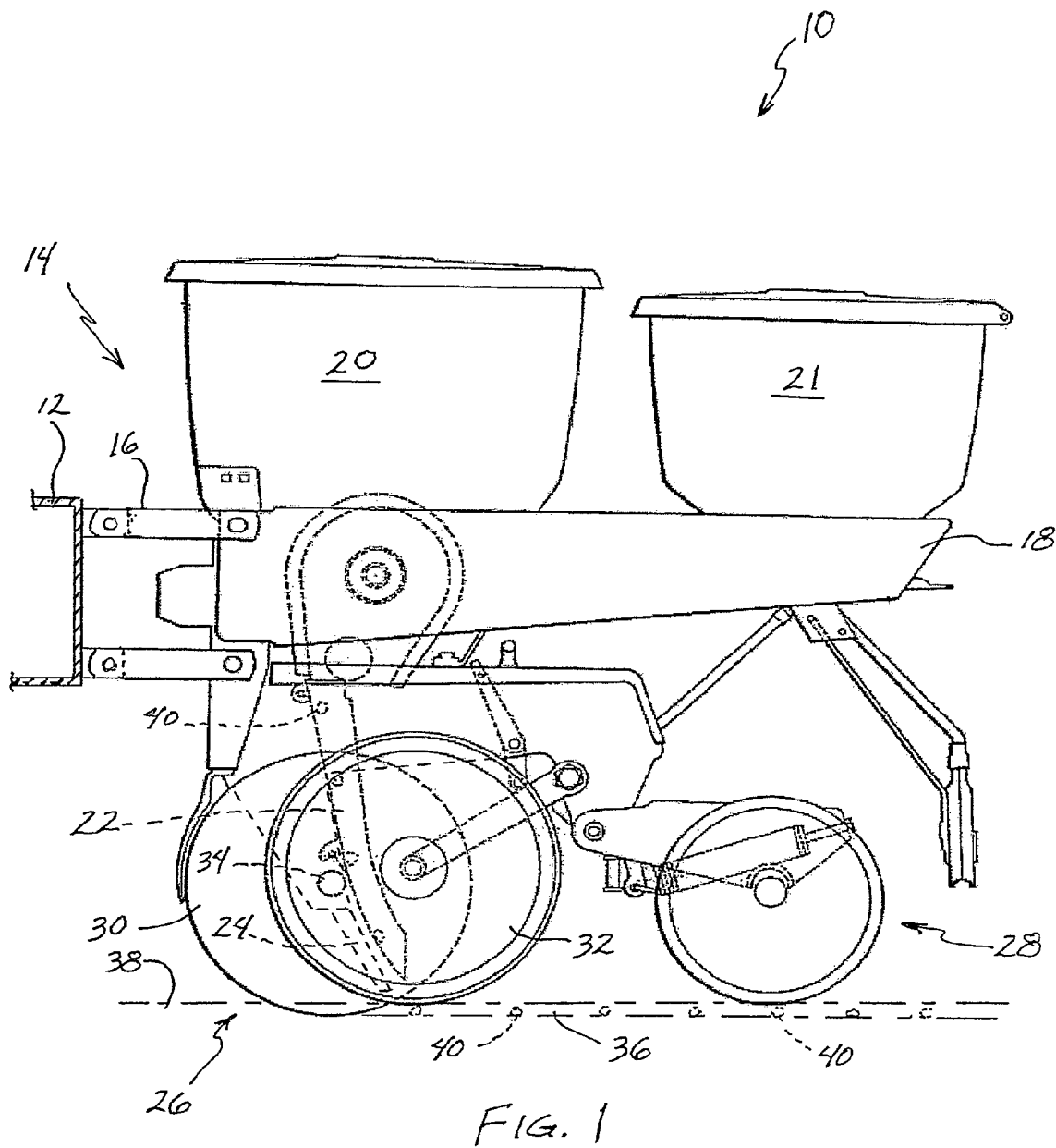
FIG. 1 is a side elevation view of a typical agricultural seed planter.
Figure 7:
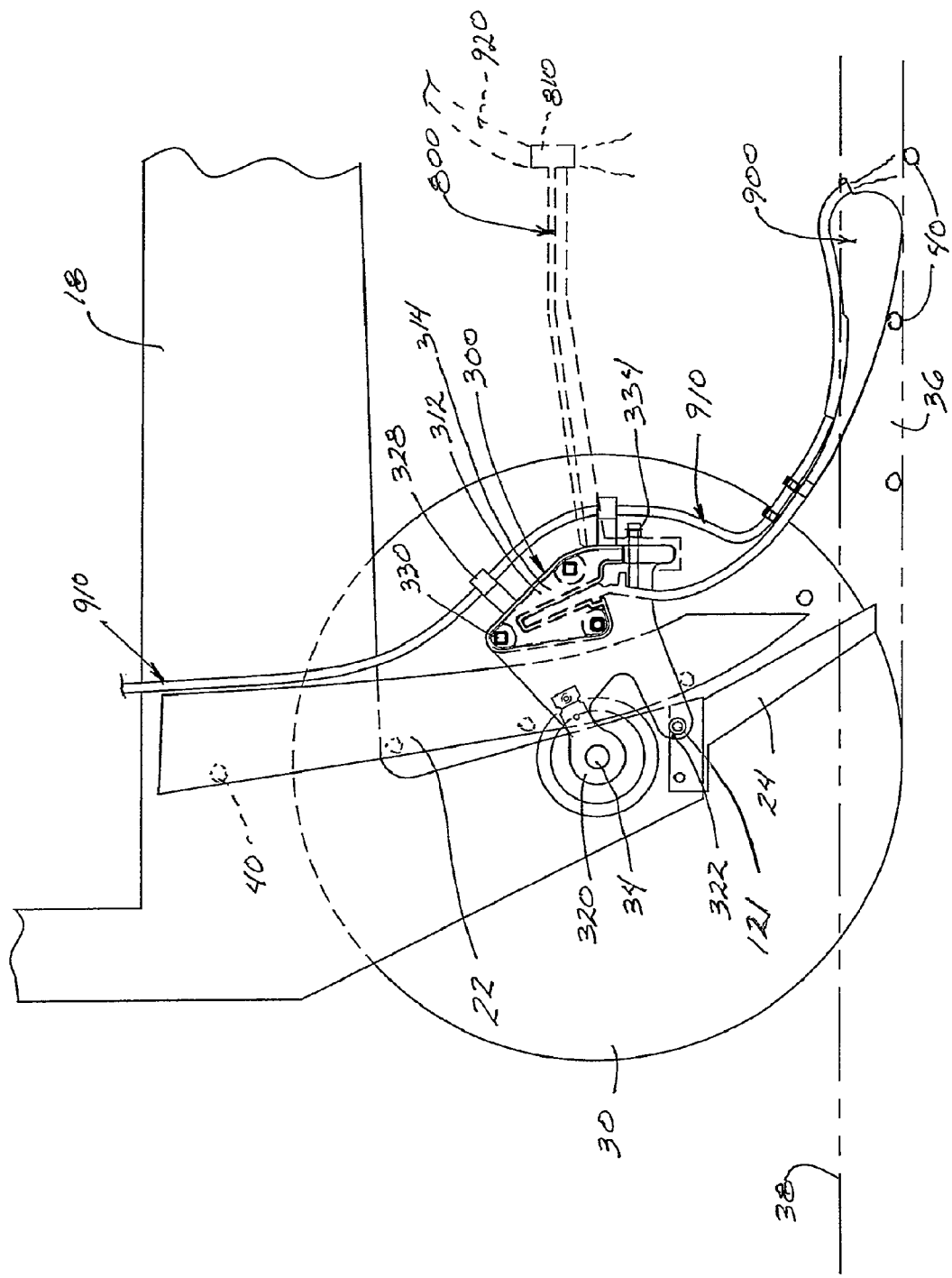
FIG. 7 is a side elevation view of the improved bracket assembly of FIG. 6 installed on a agricultural seed planter.
Figure 23:
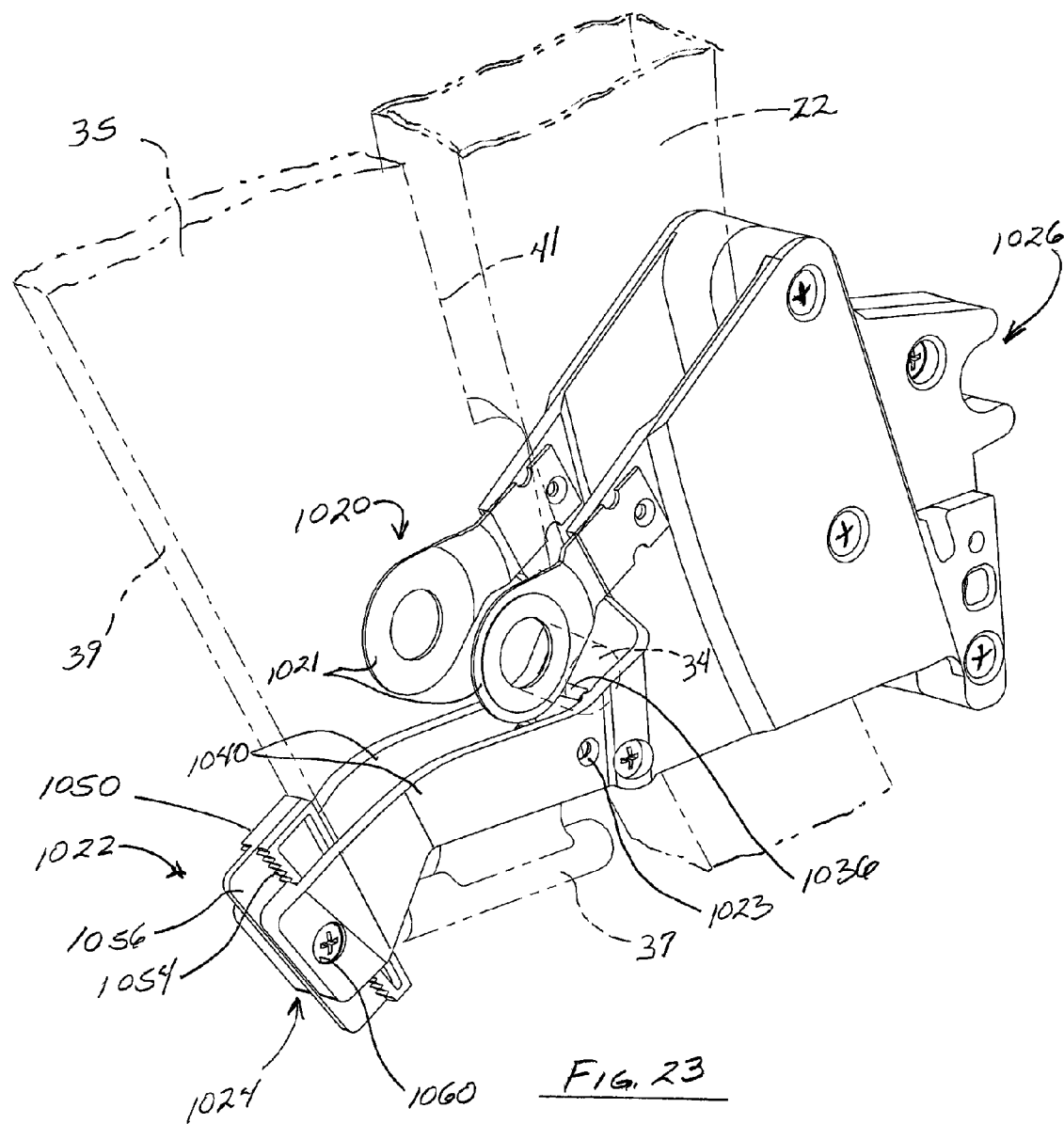
FIG. 23 is an assembled perspective view of the bracket assembly of FIG. 19.

In the drawings, like reference numerals are used to designate identical or corresponding parts or features throughout the figures. Drawing FIG. 1 illustrates a partial side elevation view of a typical John Deere row-crop agricultural seed planter 10. The seed planter 10 of FIG. 1, comprises a wheeled main frame (not shown) adapted to be pulled by a prime mover (not shown). The wheeled main frame includes a transversely disposed tool bar 12 that supports a plurality of transversely spaced row unit assemblies 14. The row unit assemblies 14 are generally vertically adjustable with respect to the tool bar 12, such as by a parallel linkage 16 or the like. Each row unit assembly 14 is generally comprised of a longitudinally disposed row unit frame 18 which typically supports at least one seed hopper 20 and an insecticide hopper 21, a seed tube 22, a seed tube guard 24, a furrow opening assembly 26, and a furrow closing assembly 28. The furrow opening assembly 26 is typically comprised of a pair of furrow opening discs 30 and a pair of gauge wheels 32. The furrow opening discs 30 are supported on a transverse shaft 34 extending transversely from a shank 35 depending from the row unit frame 18. The seed tube guard 24 is removably mounted to the shank 35 by roll-pins 25 (FIG. 7). On certain planters, including the late model John Deere XP series planters, seed tube guard 24 mounts to the shank 35 without the use of roll-pins. Instead, as best illustrated in FIGS. 15 and 23, both the shank 35 and guard 24 of the Deere XP series planters are now cast from ductile iron, with lower portion of the shank 35 incorporating a bayonet style mount 37 which is slidably received by a mating groove (not shown) in the top of the cast iron seed tube guard 24. The mount 37 and groove cooperate to removably lock the guard 24 to the shank 35 without the need for pins or other fasteners. The seed tube 22 is disposed rearwardly and in substantial alignment with the shank 35 and seed tube guard 24 and between the opening discs 30 whereby the seed tube 22 is in substantial alignment with a furrow 36 created by the opening discs 30.

In operation, the furrow opening discs 30 cut a V-shaped furrow 36 in the soil surface 38 as the planter 10 traverses the field. Seeds 40 from the seed hopper 20 are singulated by a seed metering device 42 before being discharged into the seed tube 22 wherein the seeds 40 are directed downwardly and rearwardly for depositing into the seed furrow 36. After the seeds 40 are deposited into the furrow 36, the furrow closing assembly 28 closes the furrow 36 by pushing soil over the deposited seeds 40. A more detailed description of the agricultural seed planter 10 of FIG. 1 is provided in U.S. Pat. No. 4,009,668, the specification and drawings of which are incorporated herein by reference.

It should be understood that the particular structure and arrangement of components comprising an agricultural planter or drill may vary by manufacturer, and thus, the agricultural seed planter of FIG. 1 is provided and discussed to merely provide a general example and frame of reference for use later in this specification when discussing the relative positions of the structural components typical of most agricultural planters and drills. Thus, any reference to an agricultural planter in the present application should be understood to include any agricultural row-crop seed planter or drill and not just the specific type of planter illustrated in FIG. 1.

Figure 2:
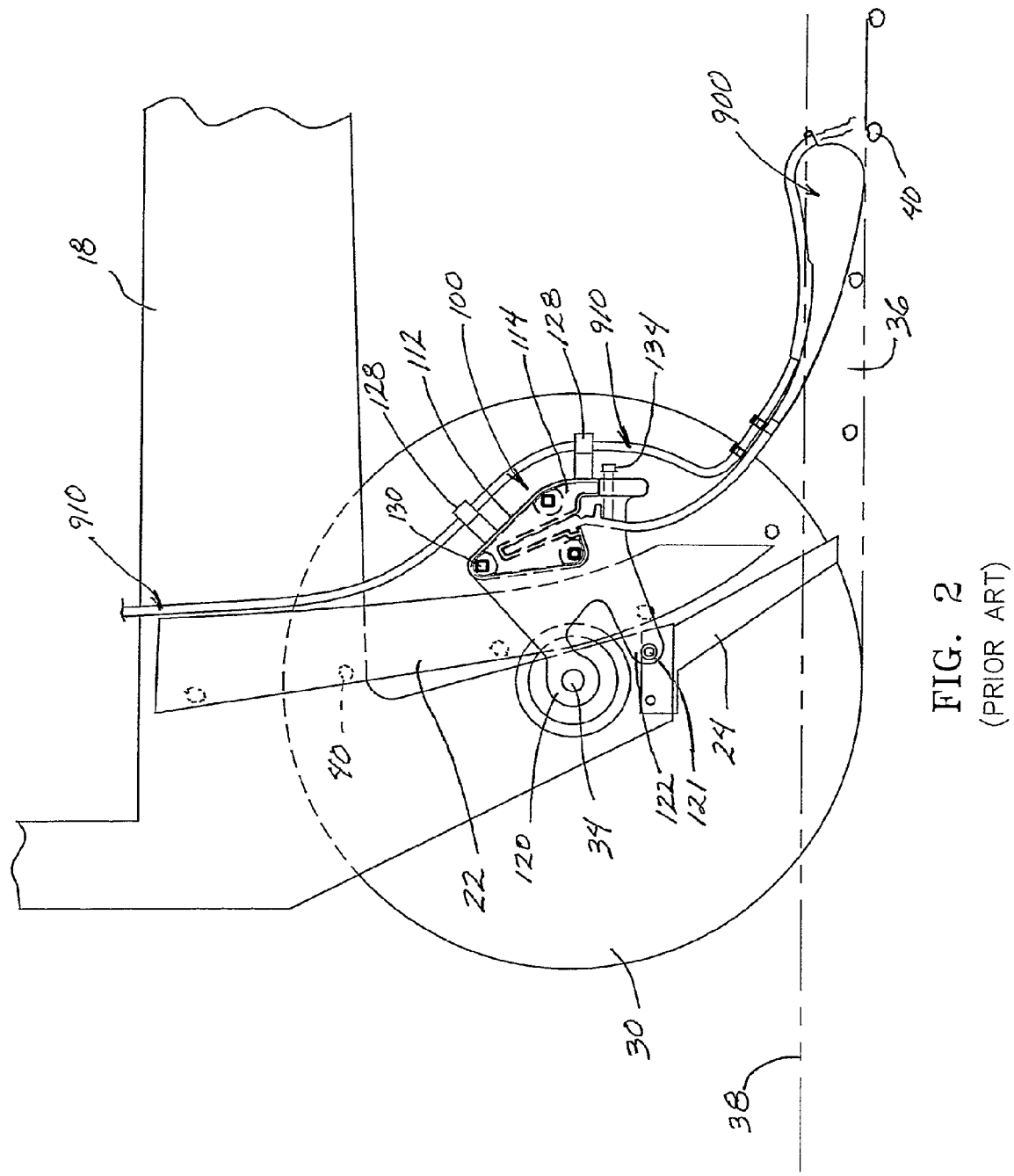
FIG. 2 is a side elevation view of a prior art bracket assembly installed on an agricultural seed planter.
Figure 3:
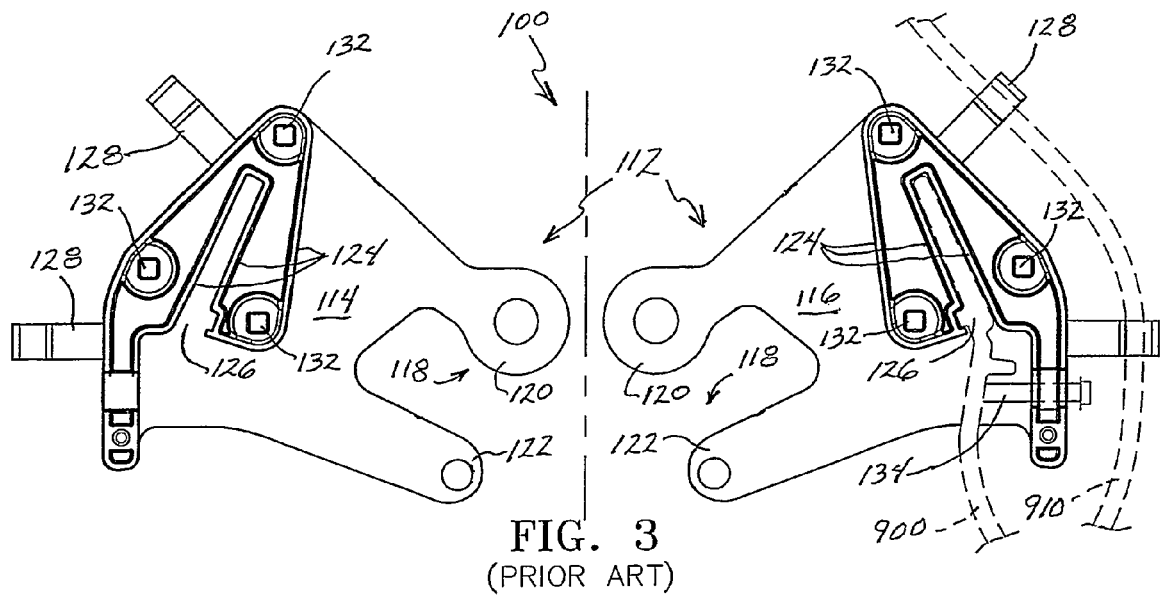
FIG. 3 is a detailed view showing the interior structure of the two sides of the prior art bracket assembly of FIG. 2.
Figure 5:
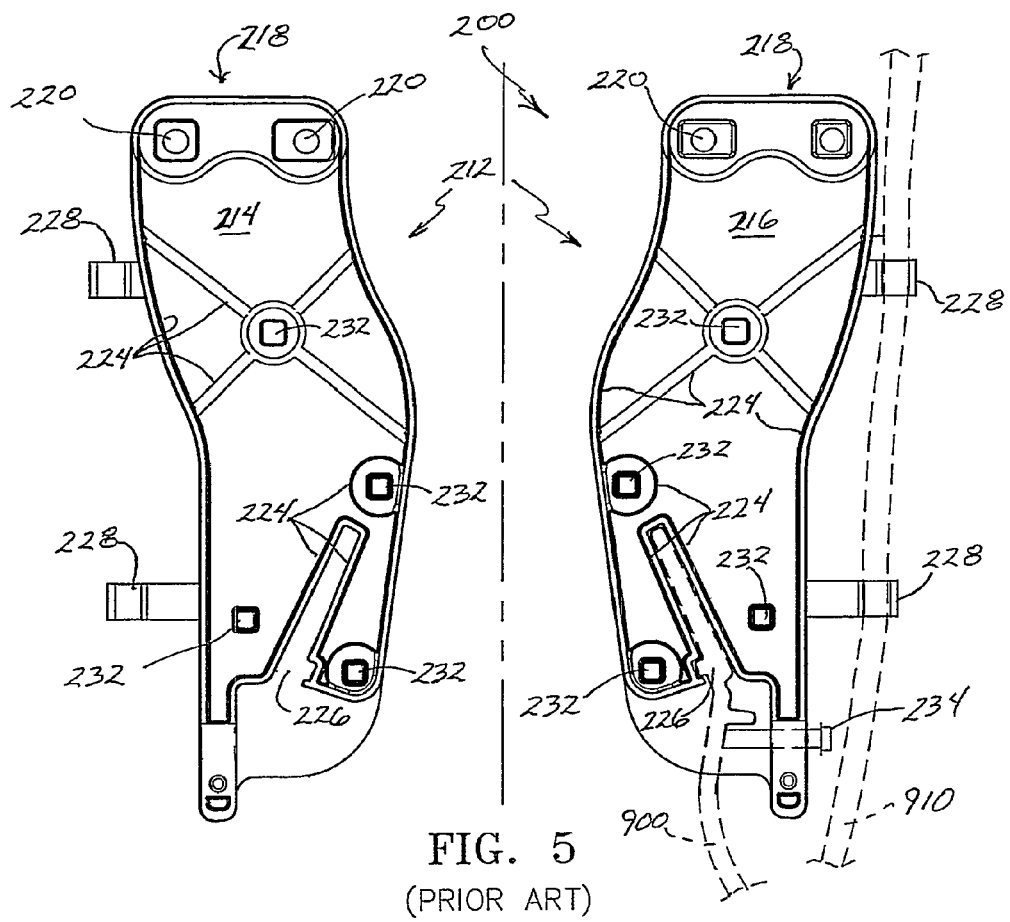
FIG. 5 is a detailed view showing the interior structure of the two sides of the prior art bracket assembly of FIG. 4.
Figure 4:
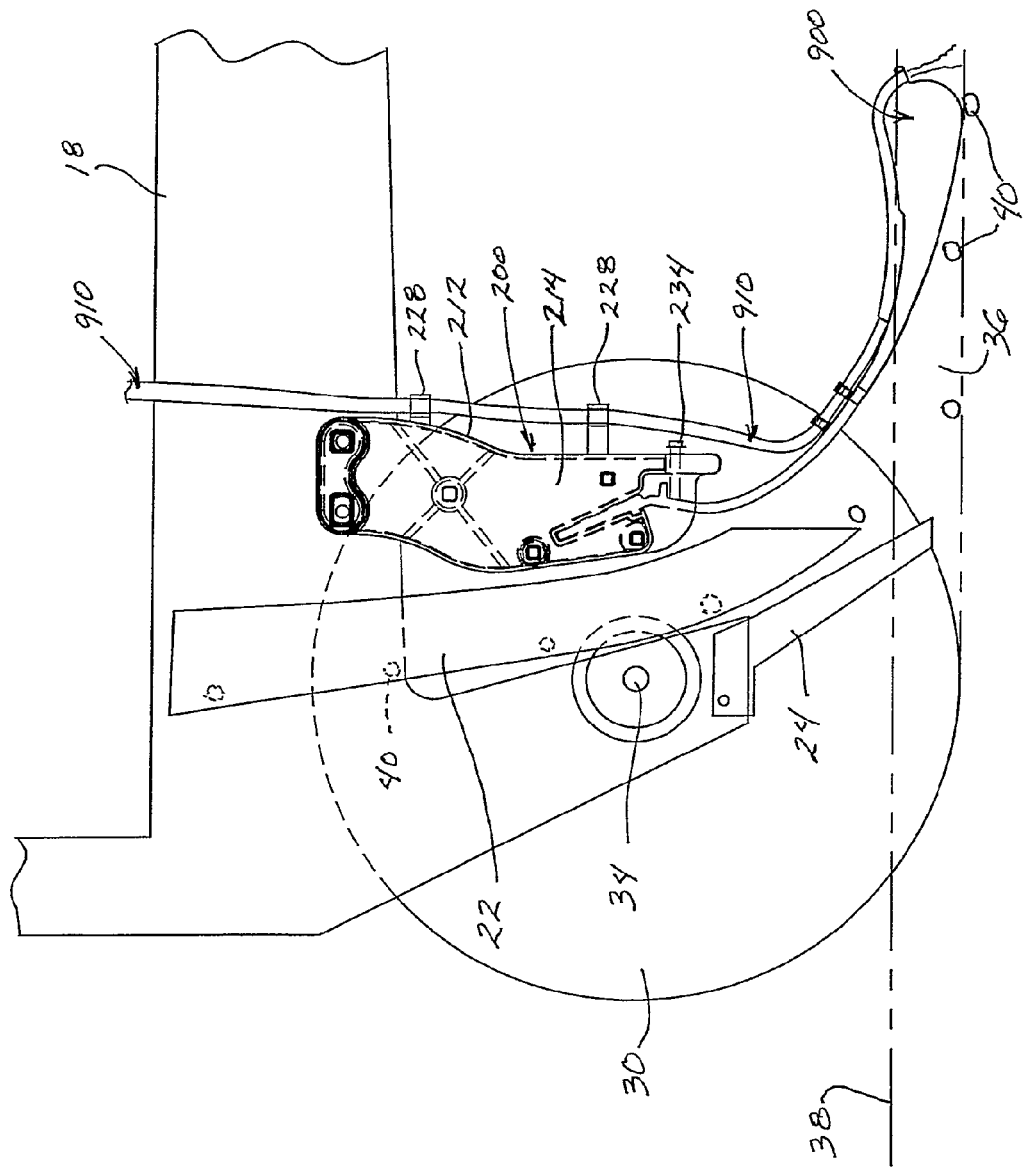
FIG. 4 is a side elevation view of another prior art bracket assembly installed on an agricultural seed planter.

Drawing FIGS. 2 and 4 illustrate, side elevation views of two types of existing bracket assemblies 100, 200 shown, by way of example only, installed on the agricultural planter 10 of FIG. 1, with one of the gauge wheels 32 and furrow opening discs 30 removed for clarity. FIGS. 3 and 5 are more detailed views showing the internal structure of the bracket assemblies 100, 200 of FIGS. 2 and 4, respectively. The bracket assemblies of FIGS. 3 and 5 are presently manufactured by Precision Planting, Inc., 23207 Townline Road, Tremont, Ill. 61568.

Referring to FIGS. 2 and 3, the existing bracket assembly 100 comprises a housing 112 having opposing, substantially mirror-image sides 114, 116. The housing 112 is made of thermoplastic material formed using an injection molding process. The bracket assembly 100 further includes mounting structure 118, comprising upper and lower ears 120, 122. The housing 112 further includes walls 124 for maintaining the first and second sides 114, 116 in spaced apart relation. The walls 124 further define a cavity 126 within which an upper end of a resilient tool 900 is receivable. The housing 112 further includes conduit supports 128 extending rearwardly and formed integrally with the housing for receiving a liquid conduit 910. The conduit supports 128 support and guide the liquid conduit 910 away from the furrow opening discs 30.

To install the bracket assembly 100, the gauge wheels 32 are removed from the row unit. The furrow opening discs 30 are also removed from the opening disc shaft 34. The sides 114, 116 of the housing 112 are mounted on opposing sides of the opening disc shaft 34 by placing the upper ears 120 over the shaft 34. The roll pin 121 securing the tube guard 24 to the row unit frame 18 is removed and lower ears 122 are attached to the seed tube guard 24 by aligning the openings and securing with a bolt and nut connection replacing the removed roll pin. The two sides 114, 116 of the housing are then secured together by inserting carriage bolts 130 through the apertures 132 in the sides of the housing 112. Once the bracket assembly 100 is mounted, the upper end of the resilient tool 900 is inserted into the cavity 126 (FIG. 3) defined by the walls 124 formed in the interior sides 114, 116 of the housing 112. The walls 124, in addition to defining the cavity 126 for receivably supporting the upper end of the resilient tool 900, also act as spacers to maintain a sufficient distance between the opposing sides 114, 116 to receive the upper end of the resilient tool 900 and to maintain the opposing side 114, 116 a sufficient distance apart such that the upper and lower ears 120, 122 extend around the seed tube 22 on either side thereof as shown in FIG. 2. With the resilient tool 900 installed in the housing 112, the adjusting screw 134 is tightened to adjust the position of the lower end of the resilient tool 900 with respect to the lower end of the housing 112, thereby increasing or decreasing the amount of force to be exerted by the resilient tool in the bottom of the seed furrow 36. The furrow opening discs 30 are then replaced and secured to the shaft 34 and the gauge wheels 32 are replaced.

If in-furrow liquid application is desired, one end of the liquid conduit 910 is inserted through the conduit supports 128. The liquid conduit 910 extends along the back of the resilient tool 900, terminating at the rearward end of the resilient tool 900. The other end of the liquid conduit 910 is fluidly connected to a liquid supply reservoir (not shown) located on the planter or prime mover. In operation, liquid is pumped from the liquid supply reservoir through the liquid conduit 910 for depositing in the furrow 36 behind the resilient tool 900.

The other existing bracket assembly 200 of FIGS. 4 and 5 is similar to the bracket assembly 100 of FIGS. 2 and 3, in that it comprises a housing 212 having substantially mirror-image opposing sides 214, 216. The housing 212 is made of thermoplastic material formed using an injection molding process. The bracket assembly 200 further includes mounting structure 218, comprising apertures 220 in the upper end of the housing 212 which mate with existing apertures provided in the row unit frame 18. The housing 212 further includes walls 224 for maintaining the first and second sides 214, 216 in spaced apart relation. The walls 224 further define a cavity 226 within which an upper end of a resilient tool 900 is receivable. The housing 212 further includes conduit supports 228 extending rearwardly and formed integrally with the housing for receiving a liquid conduit 910. The conduit supports 228 support and guide the liquid conduit 910 away from the furrow opening discs 30.

The bracket assembly 200 is mounted to the row unit frame 18 by a bolt and nut connection through the mating aligned apertures. With the housing 212 mounted to the row unit frame 18, the two sides 214, 216 of the housing are then secured together by inserting carriage bolts 230 through the apertures 232 in the sides of the housing 212. Once the bracket assembly 200 is mounted, the resilient tool 900 may be inserted into the cavity 226 (FIG. 5) defined by the walls 224 formed in the interior sides 214, 216 of the housing 212. The walls 224, in addition to defining the cavity 226 for receivably supporting the resilient tool 900, also act as spacers to maintain a sufficient distance between the opposing sides 214, 216 to receive the upper end of the resilient tool 900. With the resilient tool 900 installed in the housing 212, an adjusting screw 234 is tightened to adjust the position of the lower end of the resilient tool 900 with respect to the lower end of the housing 212, thereby increasing or decreasing the amount of force to be exerted by the resilient tool in the bottom of the furrow 36.

If in-furrow liquid application is desired, one end of the liquid conduit 910 is inserted through the conduit supports 228. The liquid conduit 910 extends along the back of the resilient tool 900, terminating at the rearward end of the resilient tool 900. The other end of the liquid conduit 910 is fluidly connected to a liquid supply reservoir (not shown) located on the planter or prime mover. In operation, liquid is pumped from the liquid supply reservoir through the liquid conduit 910 for depositing in the furrow 36 behind the resilient tool 900.

Figure 6:
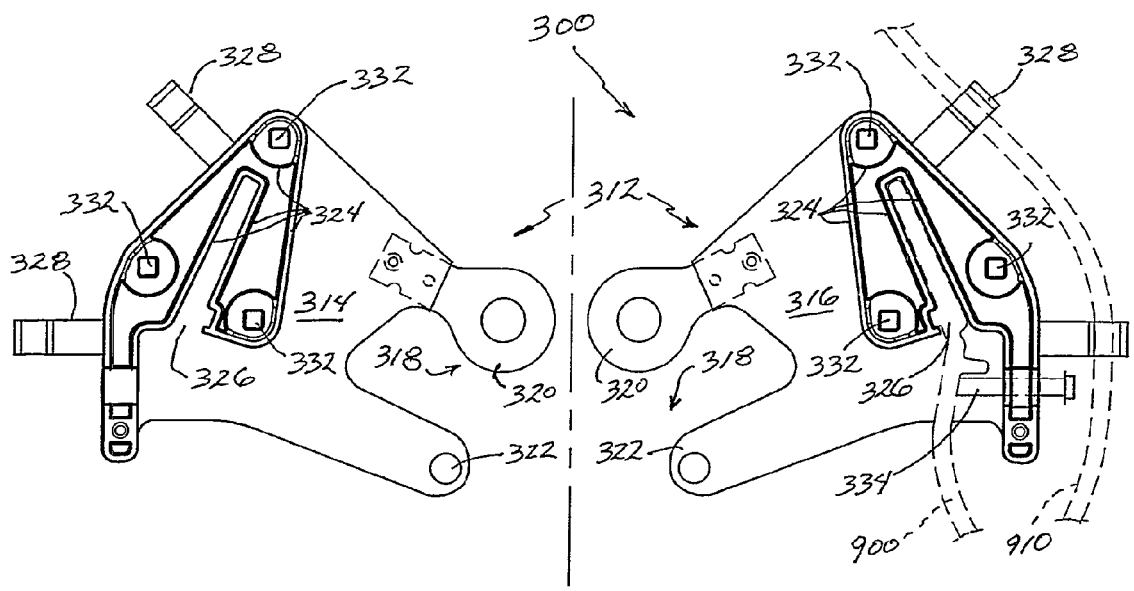
FIG. 6 is a detailed view of the interior structure of one embodiment of an improved bracket assembly of the present invention.

FIGS. 6-14 illustrate various embodiments of improved bracket assemblies comprising the present invention. Referring, first to FIG. 6, a first embodiment of an improved bracket assembly 300 is shown. As with the existing bracket assembly 100, this first improved bracket assembly 300 comprises a housing 312 having opposing, preferably substantially mirror-image, first and second sides 314, 316. The housing 312 preferably includes mounting structure 318 comprising upper and lower ears 320, 322. However, rather than the ears 320, 322 formed from thermoplastic material as in the existing bracket assembly 100, the upper ears 320 comprise metal ear tabs preferably integrally attached with the housing 312 by inserting molding the metal ear tabs 320 during the injection molding process when forming the housing 312. Alternatively, rather than insert molding, the metal ear tabs 320 may be integrally attached to the housing 312 by a rivet connection, bolted connection, adhesives or welding by any know means, or any other joining processes.

The housing 312 further includes walls 324 for maintaining the first and second sides 314, 316 in spaced apart relation. The walls 324 further define a cavity 326 within which an upper end of a resilient tool 900 is receivable. The housing 312 preferably includes conduit supports 328 extending rearwardly and formed integrally with the housing 312 for receiving a liquid conduit 910. In the preferred embodiment, a locking member 334, such as a threaded connector, is provided operable on the upper end of the resilient tool 900 to restrain the resilient tool within the cavity 326. Depending on the type of resilient tool 900 installed, the locking member 334 is also preferably operable on the upper end of the resilient tool 900 to adjust the position of the lower end of the resilient tool 900 with respect to the lower end of the housing 312, by adjusting the position of the locking member 334 with respect to the housing 312. Additionally, as shown in FIG. 7, support arm 800 (shown in dashed lines) (discussed later) may be supported by the housing 312 to support any desired number of conduits 920.

Continuing to refer to FIG. 7, to install this first improved bracket assembly 300 on an agricultural planter 10 the method is substantially the same as that described for the existing bracket assembly 100. First, if necessary, depending on the type of agricultural planter, the gauge wheels 32 on the row unit are removed and furrow opening discs 30 are removed from the opening disc shaft 34. The sides 314, 316 of the housing 312 are mounted on opposing sides of the opening disc shaft 34 by placing the upper ears 320 over the shaft 34. The roll pin securing the tube guard 24 to the row unit frame 18 is removed and lower ears 322 are attached to the seed tube guard 24 by aligning the openings and securing with a bolt and nut connection which replaces the removed roll pin. The two sides 314, 316 of the housing 312 preferably include apertures 332 for receiving a threaded connector 330, however other suitable means of connection, recognized by those skilled in the art may also be used. Once the first bracket assembly 300 is mounted, the upper end of the resilient tool 900 may be inserted into the cavity 326 defined by the walls 324 formed in the interior sides 314, 316 of the housing 312. The walls 324, in addition to defining the cavity 326 for receivably supporting the upper end of the resilient tool 900, also act as spacers to maintain a sufficient distance between the opposing sides 314, 316 to receive the upper end of the resilient tool 900 and to maintain the opposing side 314, 316 a sufficient distance apart such that the upper and lower ears 320, 322 extend around the seed tube 22 on either side thereof as shown in FIG. 7, for example. In the preferred embodiment, the locking member 334 is then adjusted to lock the resilient tool 900 within the cavity 326. Depending on the type of resilient tool 900 installed, the locking member 334 is also preferably operable to adjust the position of the lower end of the resilient tool 900 with respect to the lower end of the housing 312 to thereby increasing or decreasing the amount of force exerted by the resilient tool 900 in the bottom of the furrow 36. The furrow opening discs 30 are then replaced and secured to the shaft 34 and the gauge wheels 32 are replaced.

If in-furrow liquid application is desired, one end of the liquid conduit 910 is inserted through the conduit supports 328. Depending on the type of resilient tool 900 used, the liquid conduit 910 may extend along the back of the resilient tool 900, terminating at the rearward end of the resilient tool 900 as shown, for example, as shown in FIG. 7. The other end of the liquid conduit 910 is fluidly connected to a liquid supply reservoir (not shown) located on the planter or prime mover. In operation, liquid is pumped from the liquid supply reservoir through the liquid conduit 910 for depositing in the furrow 36, preferably behind the resilient tool 900.

Figure 8:
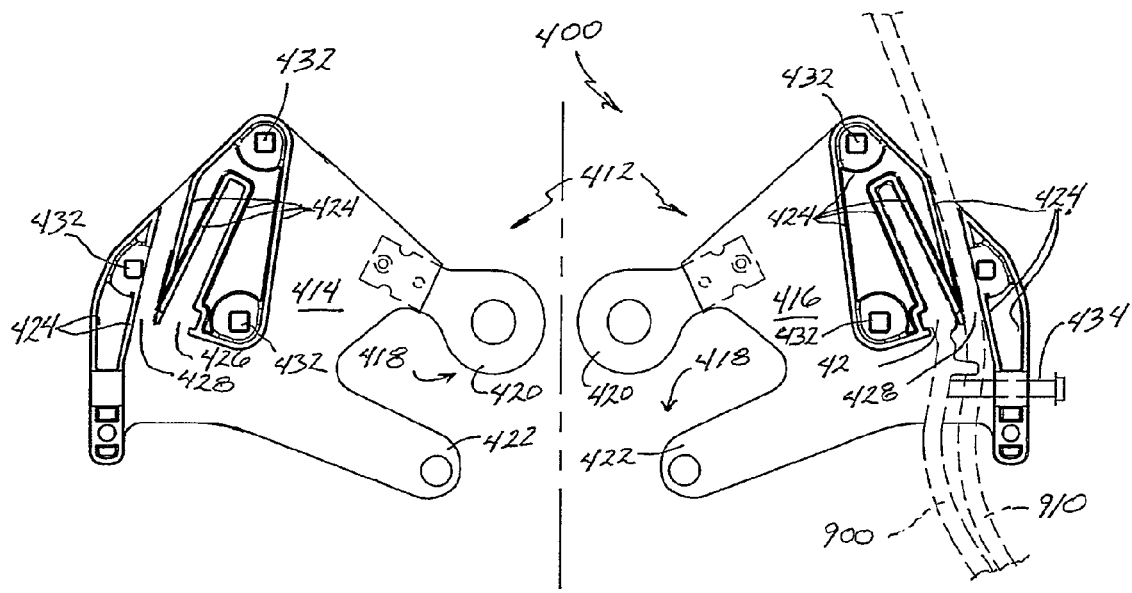
FIG. 8 is a detailed view of the interior structure of another embodiment of an improved bracket assembly of the present invention.

Referring, now to FIG. 8, another embodiment of an improved bracket assembly 400 is shown. This second improved bracket assembly 400 comprises a housing 412 having opposing, preferably substantially mirror-image, first and second sides 414, 416. The housing 412 preferably includes mounting structure 418 comprising upper and lower ears 420, 422. The upper ears 420 preferably comprise metal ears tabs preferably integrally attached with the housing 412 by inserting molding the metal ears tabs 420 during the injection molding process when forming the housing 412. Alternatively, rather than insert molding, the metal ear tabs 420 may be integrally attached to the housing 412 by a rivet connection, bolted connection, adhesives or welding by any know means, or any other joining processes.

The housing 412 further includes walls 424 for maintaining the first and second sides 414, 416 in spaced apart relation. The walls 424 further define a cavity 426 within which an upper end of a resilient tool 900 is receivable. The walls 424 further define a passageway 428 which extends through at least a portion of the housing 412 through which a liquid conduit 910 is receivable. In the preferred embodiment, a locking member 434, such as a threaded connector, is provided operable on the upper end of the resilient tool 900 to restrain the resilient tool within the cavity 426. Depending on the type of resilient tool 900 installed, the locking member 434 is also preferably operable on the upper end of the resilient tool 900 to adjust the position of the lower end of the resilient tool 900 with respect to the lower end of the housing 412, by adjusting the position of the locking member 434 with respect to the housing 412.

Figure 9:
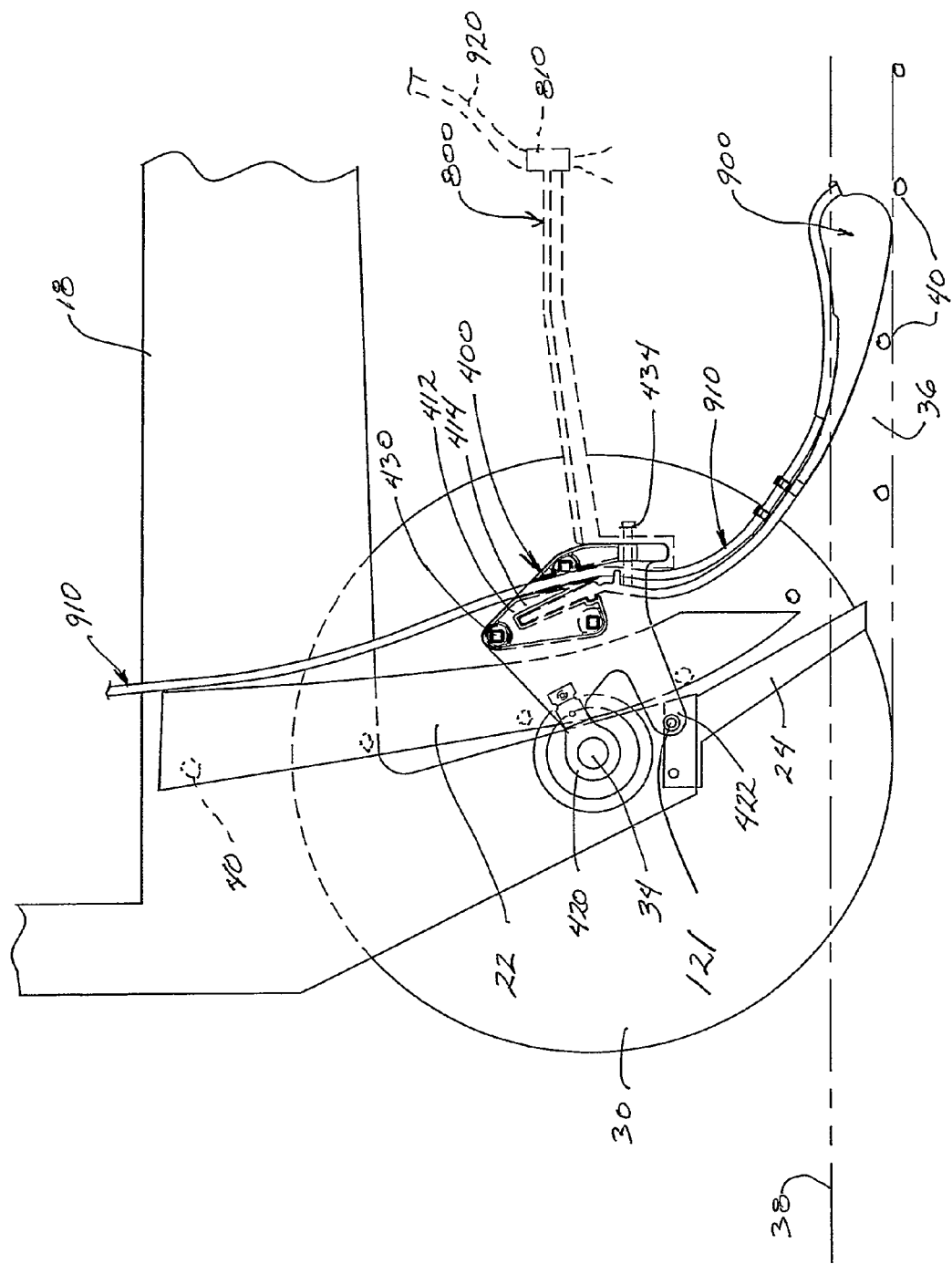
FIG. 9 is a side elevation view of the improved bracket assembly of FIG. 8 installed on a agricultural seed planter.

As shown in FIG. 9, a support arm 800 (shown in dashed lines) (discussed later) may be supported by the housing 412 to support any desired number of conduits 920. As previously identified, the second improved bracket assembly 400 includes a passageway 428 defined by the walls 424. The passageway 428 extends through at least a portion of the housing 412 through which a liquid conduit 910 is receivable. Accordingly, if in-furrow liquid application is desired, one end of the liquid conduit 910 is inserted through the passageway 428 within the housing 412. Depending on the type of resilient tool 900 installed in the cavity 426, the liquid conduit 910 may extend along the back of the resilient tool 900, terminating at the rearward end of the resilient tool 900 as shown in FIG. 9. The other end of the liquid conduit 910 is fluidly connected to a liquid supply reservoir (not shown) located on the planter or prime mover. In operation, liquid is pumped from the liquid supply reservoir through the liquid conduit 910 for depositing in the furrow, preferably behind the resilient tool 900.

Figure 10:
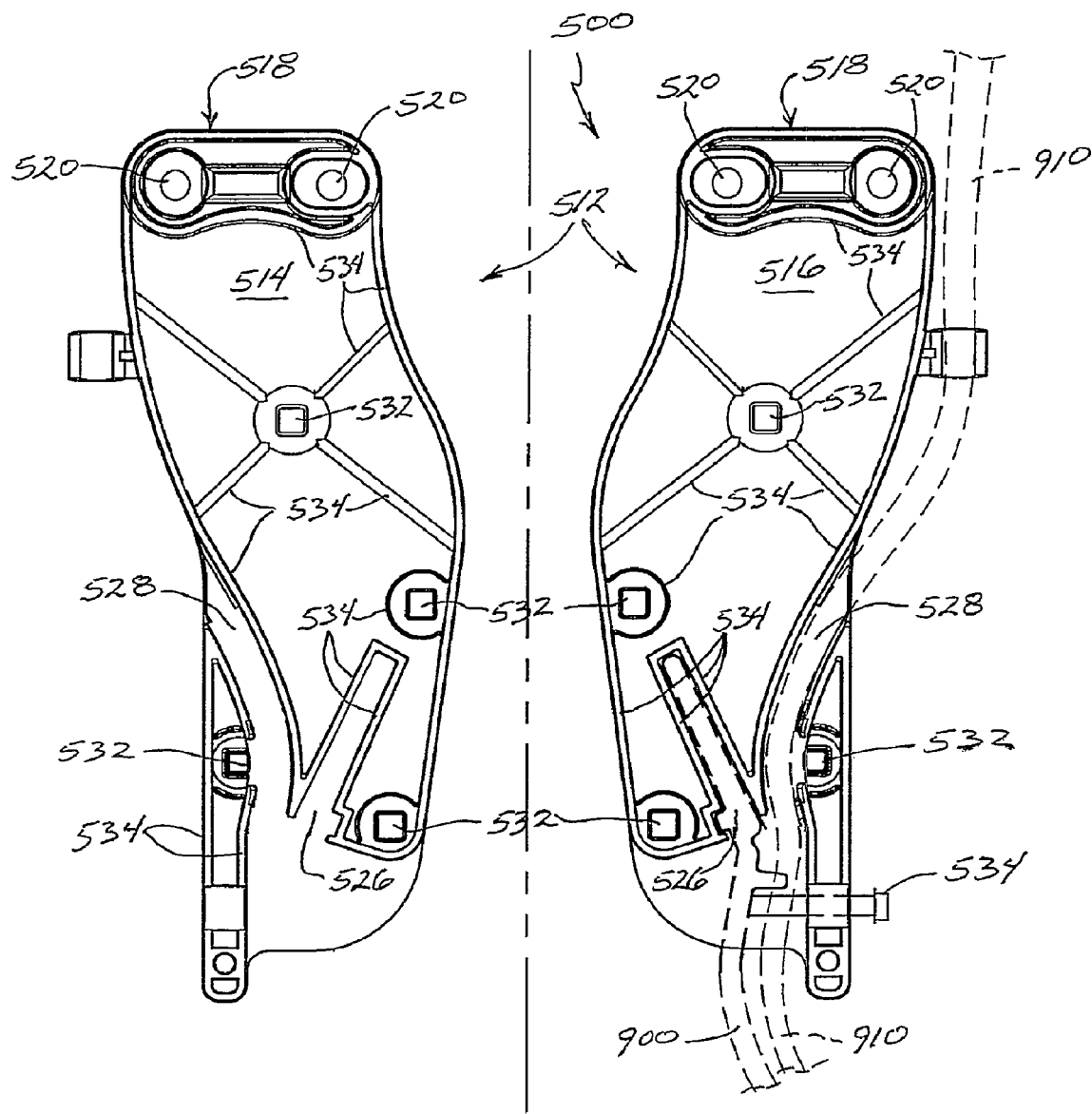
FIG. 10 is a detailed view showing the interior structure of another embodiment of an improved bracket assembly of the present invention.

Referring, now to FIG. 10, yet another improved bracket assembly 500 is shown. This third improved bracket assembly 500 comprises a housing 512 having opposing, preferably substantially mirror-image, first and second sides 514, 516. The sides 514, 516 of the housing further include mounting structure 518, comprising apertures 520 in the upper end of the housing 512 adapted to mate with apertures provided in the row unit frame 18. The housing 512 further includes walls 524 for maintaining the first and second sides 514, 516 in spaced apart relation. The walls 524 further define a cavity 526 within which an upper end of a resilient tool 900 is receivable. The walls 524 further define a passageway 528 which extends through at least a portion of the housing 512 through which a liquid conduit 910 is receivable. In the preferred embodiment, a locking member 534, such as a threaded connector, is provided operable on the upper end of the resilient tool 900 to restrain the resilient tool within the cavity 526. Depending on the type of resilient tool 900 installed, the locking member 534 is also preferably operable on the upper end of the resilient tool 900 to adjust the position of the lower end of the resilient tool 900 with respect to the lower end of the housing 512, by adjusting the position of the locking member 534 with respect to the housing 512.

Figure 11:
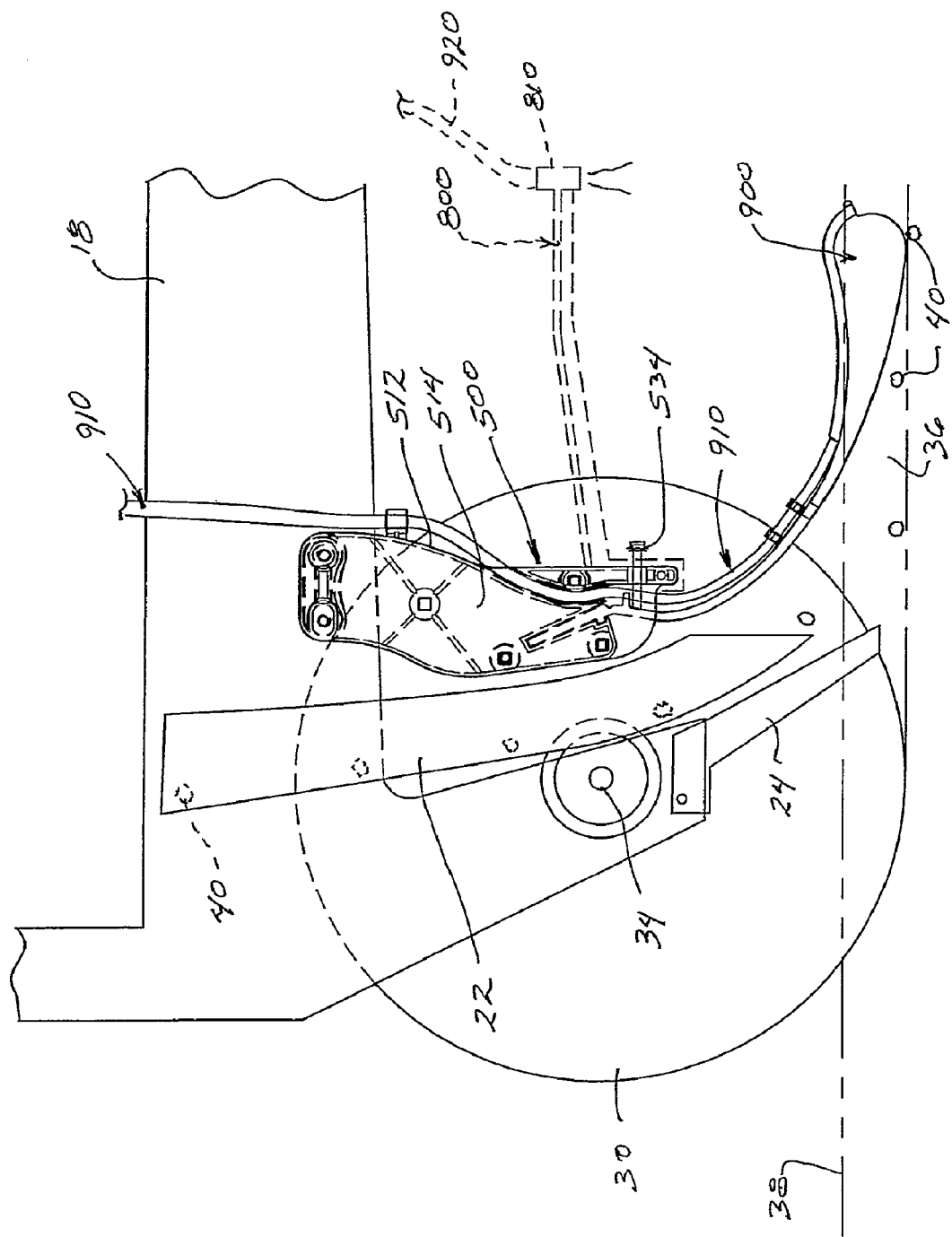
FIG. 11 is a side elevation view of the improved bracket assembly of FIG. 10 installed on a agricultural seed planter.

As shown in FIG. 11, a support arm 800 (shown in dashed lines) (discussed later) may be supported by the housing 512 to support any desired number of conduits 920. The third improved bracket assembly 500 is preferably mounted to the row unit frame 18 by a bolt and nut connection through the mating aligned apertures. With the housing 512 mounted to the row unit frame 18, the two sides 514, 516 of the housing are then secured together. The two sides 514, 516 of the housing 512 preferably include apertures 532 for receiving a threaded connector 530, however other suitable means of connection, recognized by those skilled in the art may also be used. Once the third improved bracket assembly 500 is mounted, the resilient tool 900 may be inserted into the cavity 526 defined by the walls 524 formed in the interior sides 514, 516 of the housing 512. The walls 524, in addition to defining the cavity 526 for receivably supporting the upper end of the resilient tool 900, also act as spacers to maintain a sufficient distance between the opposing sides 514, 516 to receive the upper end of the resilient tool 900. In the preferred embodiment, the locking member 534 is then adjusted to lock the resilient tool 900 within the cavity 526. Depending on the type of resilient tool 900 installed, the locking member 534 also preferably adjusts the position of the lower end of the resilient tool 900 with respect to the lower end of the housing 512 to thereby increasing or decreasing the amount of force exerted by the resilient tool 900 in the bottom of the furrow 36.

As previously identified, the third improved bracket assembly embodiment 500 includes a passageway 528 defined by the walls 524. The passageway 528 extends through at least a portion of the housing 512 through which a liquid conduit 910 is receivable. Accordingly, if in-furrow liquid application is desired, one end of the liquid conduit 910 is inserted through the passageway 528 within the housing 512. Depending on the type of resilient tool 900 installed in the cavity 526, the liquid conduit 910 may extend along the back of the resilient tool 900, terminating at the rearward end of the resilient tool 900 as shown in FIG. 11. The other end of the liquid conduit 910 is fluidly connected to a liquid supply reservoir (not shown) located on the planter or prime mover. In operation, liquid is pumped from the liquid supply reservoir through the liquid conduit 910 for depositing in the furrow, preferably behind the resilient tool 900.

It should be understood that although the preferred embodiments of the improved bracket assemblies 300, 400, 500 are described and illustrated to be particularly adapted for use with the Keeton™ seed firmer type resilient tools 900, those skilled in the art will recognize and appreciate that the bracket assemblies, 300, 400, 500 could be modified to accommodate other resilient tools, such as those disclosed in U.S. Pat. No. 2,533,474 issued to Hyland; U.S. Pat. No. 5,092,255 issued to Long et al.; and U.S. Pat. No. 6,283,050 issued to Schaffert. Those skilled in the art will recognize that in order to receive and support such other resilient tools 900, the housing and interior walls defining the cavities merely need to be configured to receiving and support an upper end of such resilient tools. Accordingly, the present invention should not be construed as being limited to a bracket assembly particularly adapted to receive and support only Keeton™ seed firmer type resilient tools.

Figure 12:
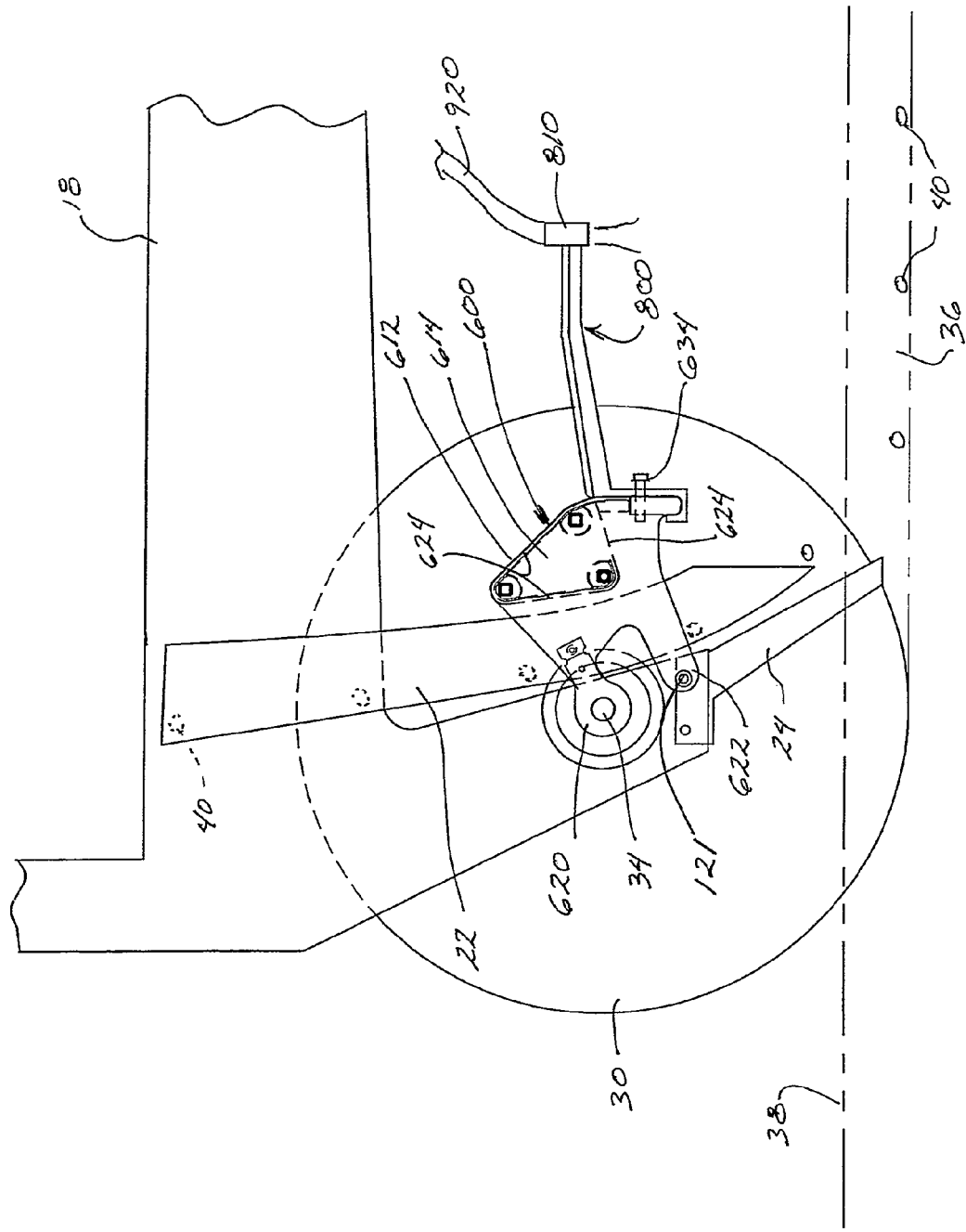
FIG. 12 is a side elevation view of another embodiment of the improved bracket assembly of the present invention installed on a agricultural seed planter.

FIG. 12 illustrates yet another embodiment of an improved bracket assembly 600 having a support arm 800 (described later) for supporting any desired number of conduits 920. Furthermore, this fourth improved bracket assembly 600 need not receive and support a resilient tool 900. The fourth improved bracket assembly 600 comprises a housing 612 having opposing, preferably substantially mirror-image, first and second sides 614, 616. The housing 612 preferably includes mounting structure 618 comprising upper and lower ears 620, 622. The upper ears 620 may be formed from the same material as the rest of the housing 612, but preferably the upper ears 620 comprise metal ears tabs integrally attached to the housing 612 as previously described with respect to the first and second improved bracket assemblies 300, 400. The housing 612 further includes walls 624 for maintaining the first and second sides 614, 616 in spaced apart relation. The housing 612 may include conduit supports (not shown) similar to the conduit supports 328 as in the first improved bracket assembly embodiment 300, or alternatively the walls 624 may define a passageway (not shown) similar to the passageway 428 as in the second improved bracket assembly embodiment 400. The fourth improved bracket assembly 600 may be mounted to the planter frame 18 in the same manner as previously described for the first and second improved bracket assembly embodiments 300, 400.

Figure 13:
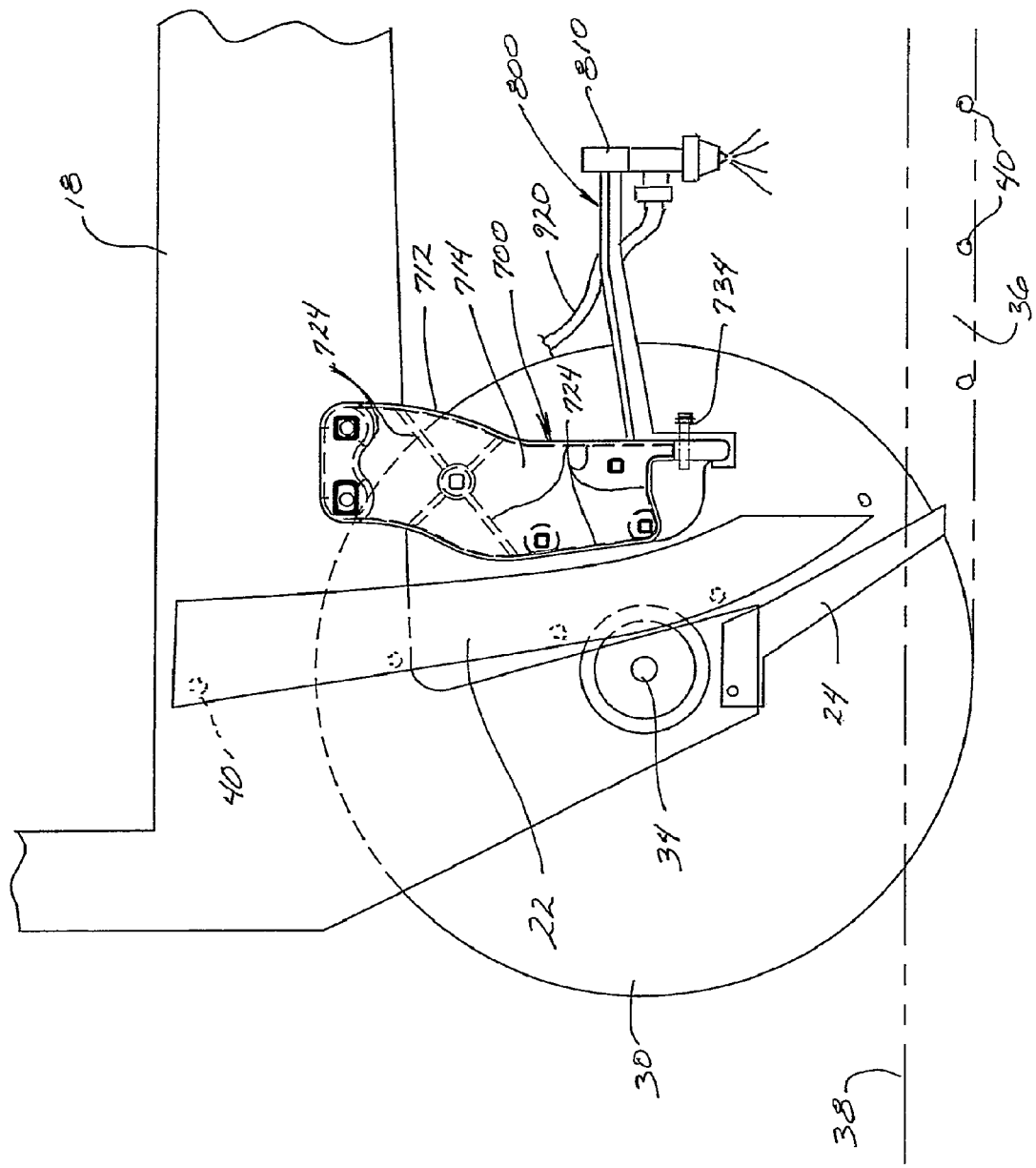
FIG. 13 is a side elevation view of another embodiment of the improved bracket assembly of the present invention installed on a agricultural seed planter.

FIG. 13 illustrates yet another embodiment of an improved bracket assembly 700 having a support arm 800 (described later) for supporting any desired number of conduits 920. Furthermore, this fifth improved bracket assembly 700 need not receive and support a resilient tool 900. The fifth improved bracket assembly 700 comprises a housing 712 having opposing, preferably substantially mirror-image, first and second sides 714, 716. The two sides 714, 716 of the housing 712 preferably include apertures 732 for receiving a connector 730, however other suitable means of connection, recognized by those skilled in the art may also be used. The housing 712 further includes walls 724 for maintaining the first and second sides 714, 716 in spaced apart relation. The housing 712 may include conduit supports (not shown) similar to the conduit supports 228 as in the existing bracket assembly 200, or alternatively the walls 724 may define a passageway (not shown) similar to the passageway 528 as in the third improved bracket assembly embodiment 500. The fifth improved bracket assembly 700 may be mounted to the planter frame 18 in the same manner as previously described for the third improved bracket assembly embodiment 500.

Figure 14:
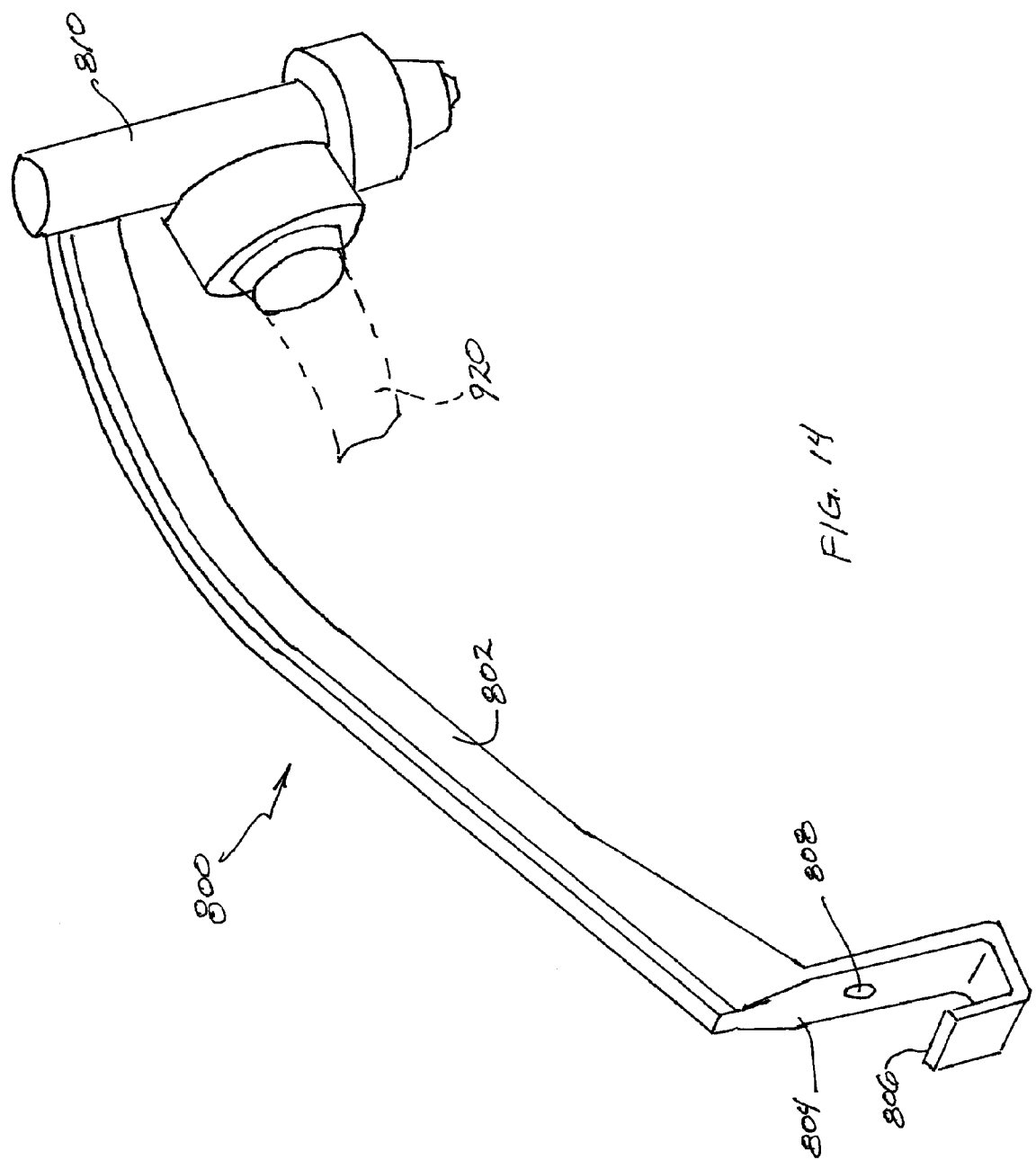
FIG. 14 is a perspective view of an embodiment for a support arm.

FIG. 14 illustrates a perspective view of one embodiment of a support arm 800. The support arm 800 may be attached to the foregoing first, second and third improved bracket assembly embodiments 300, 400, 500 for example, as shown by dashed lines in FIGS. 7, 9 and 11, or to the fourth and fifth bracket assembly embodiments 600, 700, for example as shown in FIGS. 12 and 13. As previously discussed, the support arm may be used to support any number of desired conduits 920. For example, the support arm 800 may support a conduit 920 in fluid communication with the same liquid supply reservoir previously discussed to which the liquid conduit 910 is in fluid communication, or the conduit 920 may be the same liquid conduit 910. Alternatively, the conduit 920 may be in fluid communication with a second liquid supply (not shown) to deliver a second liquid supply to the furrow 36. Alternatively, the conduit 920 may be in communication with the insecticide hopper 21 or another reservoir containing insecticides, fungicides or other liquid, powder or granular products or chemicals desired for in-furrow application.

The support arm 800 may be integral and formed with the housing 312, 412, 512, 612, 712 during the preferred injection molding process for forming the improved bracket assembly embodiments 300, 400, 500, 600, 700. Preferably, however, the support arm 800 is a separate assembly that removably attaches to the housing 312, 412, 512, 612, 712 of the improved bracket assembly embodiments 300, 400, 500, 600, 700. As shown in FIG. 14, the support arm 800 includes an elongated arm 802, having a first end 804 terminating in a U-shaped channel 806 adapted to receive the lower end of the housing 312, 412, 512, 612, 712. Additionally, the support arm 800 preferably includes an aperture 808 within the U-shaped channel 806 which is adapted to mate with the aperture for the locking member 334, 434, 534, 634, 734 of the improved bracket assembly 300, 400, 500, 600, 700 such that the locking member 334, 434, 534, 634, 734 removably secures the support arm 800 to the housing 312, 412, 512, 612, 712 of the improved bracket assembly 300, 400, 500, 600, 700. The other end of the arm 808 preferably includes a fitting 810 adapted to receive and support the conduit 920. Depending on the product to be communicated to the furrow, the fitting 810 may simply comprise a pipe section sized to receive and support the conduit 920, for example as shown in FIG. 12. Alternatively, the fitting 810 may comprise a nozzle fitting that connects to the end of the conduit 920 to provide a desired spray pattern for the product being applied as shown in FIG. 13. Furthermore, one or more additional fittings 810 could be provided along the length of the arm 802 to support multiple conduits 910, 920.

It should be appreciated that various means of supporting the support arm 800 from the housing 312, 412, 512, 612, 712 are possible, depending on the configuration of the bracket assembly. For example, rather than a U-shaped channel 806, the first end 804 may simply include a flange or other structure which secures to the housing by a clip, threaded connector or any other method for connecting. Accordingly, the support arm 800 should not be considered as limited to the embodiment shown in FIG. 14. Additionally, the desired length of the support arm 800 may vary depending on space constraints, the number of conduits 920 to be supported, or whether it is desired to deliver the product with respect to the seed tube 22.

Figure 17:
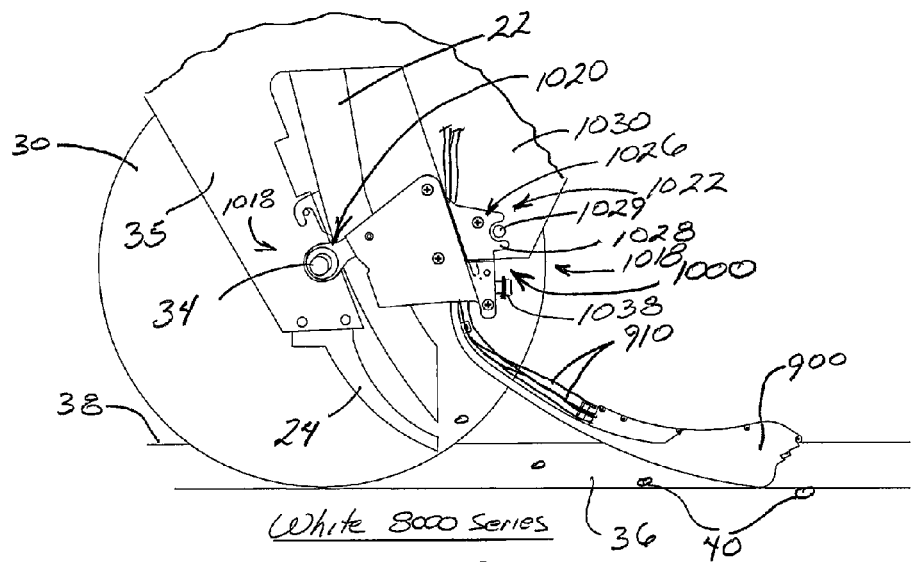
FIG. 17 is a side elevation view illustrating another embodiment of a bracket assembly of the present invention disposed on and adapted for use with the furrow opening assembly of a White 8000 series planter.

FIGS. 15-20 illustrate one embodiment of a universal bracket assembly 1000 for use with planters having a shank 35 disposed forwardly of, and in substantial alignment with, the seed tube 22. For example, FIG. 15 is an illustration of the bracket assembly 1000 in use on a john Deere XP series planter, which, as previously described, utilizes ductile cast iron shanks which eliminates the roll-pin attachment of seed tube guard 24 used for mounting the previously described bracket assemblies 300, 400, 600. FIG. 16 illustrates the bracket assembly 1000 in use on a Kinze 3000 series planters. FIG. 17 illustrates the bracket assembly 1000 in use on a White 8000 series planters.

In the preferred embodiment, the universal bracket assembly 1000 includes a shaft mount 1020 for mounting to the shaft 34 of the opening disc 30, and a shank mount 1022 for mounting to the shank 35. As illustrated in FIGS. 15 and 16, for all existing John Deere planters, whether XP series or earlier models, and for all existing Kinze planters, the shank mount 1022 comprises a forward shank-engaging mount 1024. For White planters, however, due to spacing limitations and the position of the seed tube 22 with respect to the shank 35, a forward shank-engaging mount is not feasible. Thus, for White planters, the shank mount 1022 comprises a rearward shank-engaging mount 1026 that includes a rearwardly projecting lobe 1028 adapted to receive the spacer pin 1029 disposed in the rearward gusset 1030 of the shank 35.

It should be appreciated that in order to provide a more universal bracket assembly, the preferred embodiment comprises a shank mount 1022 having both a forward shank-engaging mount 1024 and a rearward shank-engaging mount 1026. It being understood, however, that in certain applications, one of the mounts 1024, 1026 may not be necessary (as is the case with the rearward shank-engaging mount 1026 for Deere planters and Kinze planters as illustrated in FIGS. 15 and 16). It should also be understood that in certain applications, one of the shank mounts 1022 may actually need to be removed (as is the case with the forward shank-engaging mount 1024 when utilizing the preferred embodiment for White planters as illustrated in FIG. 17). Thus, based on the foregoing, it should be appreciated that although the preferred embodiment includes both forward and rearward shank-engaging mounts 1024, 1026, the present invention is not limited to such embodiments and may be provided with only one shank engaging mount 1022.

In addition, the preferred embodiment also continues to include an aperture 1023 in the forward shank engaging mount 1024 which may be used for attaching the bracket 1000 in the manner described for the other bracket embodiments, 300, 400, 600 on planters which continue to use the roll-pin for mounting the tube guard 24 to the shank 35.

Figure 19:
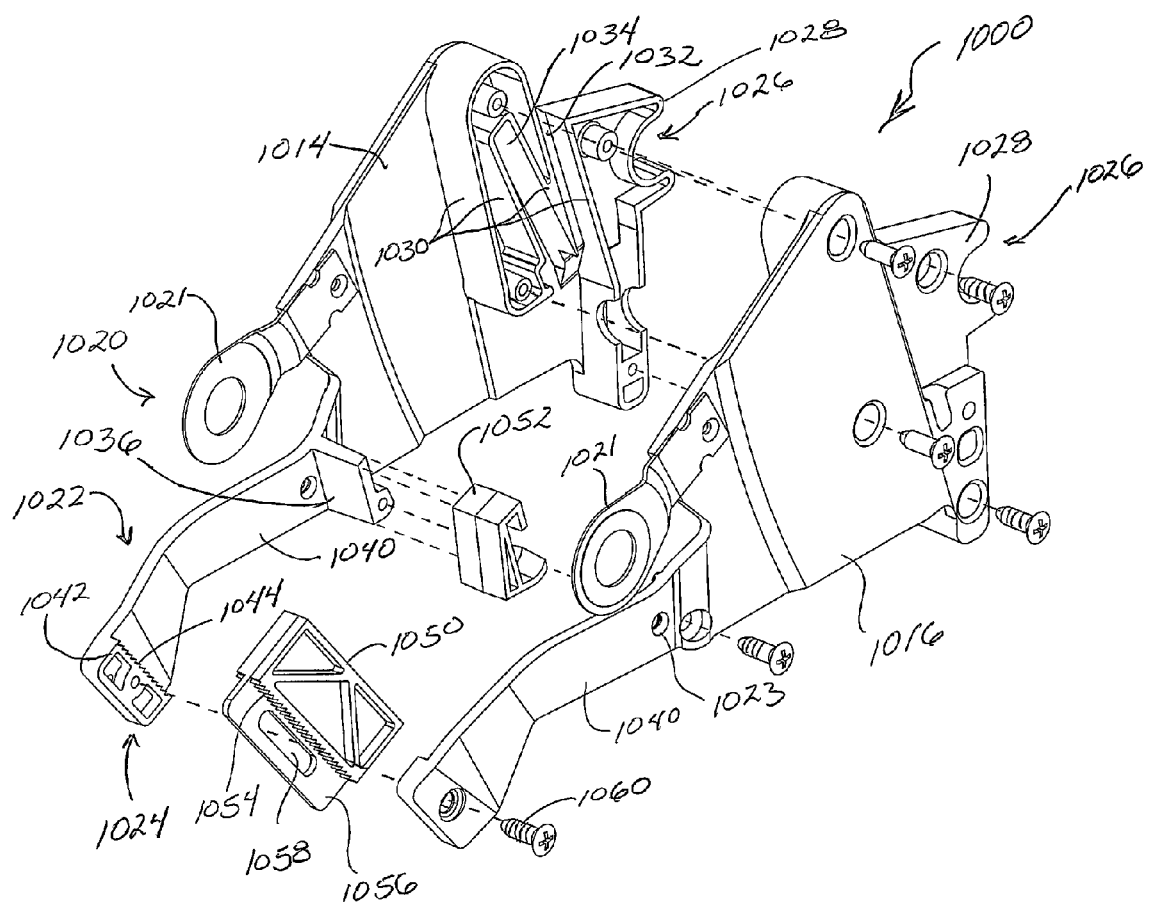
FIG. 19 is an exploded perspective view showing the embodiment of the bracket assembly illustrated in FIGS. 15, 16 and 17.

FIG. 19 is an exploded perspective view of the preferred embodiment of the universal bracket assembly 1000. FIG. 23 is an assembled perspective view of the preferred universal bracket assembly 1000 showing the shank 35 and seed tube 22 drawn in phantom lines for reference only.

Figure 18:
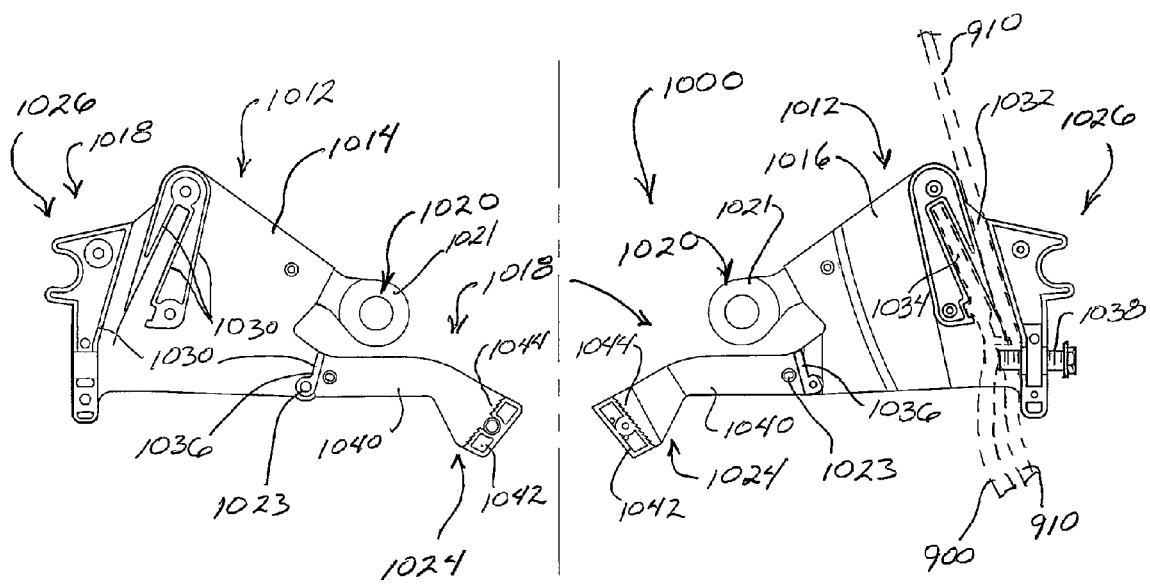
FIG. 18 is a detailed view showing the interior structure of the two sides of the embodiment of the bracket assembly illustrated in FIGS. 15, 16 and 17.

As best illustrated in FIG. 18, the preferred bracket assembly 1000 includes a housing 1012 having opposing, preferably mirror-image, first and second sides 1014, 1016. The housing 1012 preferably includes mounting structure 1018 comprising a shaft mount 1020 and a shank mount 1022 as previously discussed. As with the previous bracket assembly embodiments 300, 400, 600 described above, the shaft mount 1020 preferably comprise metal ear tabs 1021 preferably integrally attached to the housing 1012 by insert molding the metal ear tabs 1021 during the injection molding process when forming the housing 1012. Alternatively, as previously described with the other embodiments 300, 400, 600, rather than insert molding, the metal ear tabs 1021 may be attached to the housing 1012 by a rivet connection, bolted connection, adhesives or welding by any know means, or any other joining processes.

As with the other previously described embodiments, 300, 400, 600, the interior of the housing 1012 of the preferred bracket assembly 1000 preferably includes walls 1030 for maintaining the first and second sides 1014, 1016 in spaced apart relation a sufficient distance so that the seed tube 22 is receivable between the sides 1014, 1016 as best illustrated in FIG. 19. The walls 1030 also preferably define a passageway 1032 which extends through at least a portion of the housing 1012 through which a liquid conduit 910 is receivable. The walls 1030 also preferably define a cavity 1034 for receiving an upper end of a resilient tool 900. The walls 1030 also preferably define a stop 1036 for engaging a rearward edge 41 (FIG. 23) of the shank 35. In the preferred embodiment, a locking member 1038, such as a threaded connector, is provided, operable on the upper end of the resilient tool 900 to restrain the resilient tool within the cavity 1034. Depending on the type of resilient tool 900 installed, the locking member 1038 is also preferably operable on the upper end of the resilient tool 900 to adjust the position of the lower end of the resilient tool 900 with respect to the lower end of the housing 1012, by adjusting the position of the locking member 1038 with respect to the housing 1012. Additionally, although not shown, a support arm 800 may be supported by the housing 1012 to support any desired number of conduits 920 as illustrated with the other bracket assembly embodiments, 300, 400, 600 discussed above.

Referring now to FIGS. 18, 19 and 23, a perspective view of the bracket 1000 is illustrated showing the upper ears 1021 of the shaft mount 1020 disposed over the shaft 34 extending transversely from shank 35. The forward shank-engaging mount 1024 includes a forwardly extending arm 1040 the distal end of which includes a raised surface 1042 having a stepped or toothed rearward edge 1044. The forwardly extending arm 1040 is preferably of sufficient length and configuration to extend around the shank 35 of the planter as illustrated in FIGS. 15, 16 and 23. As previously discussed, it is recognized that configuration of the shank 35 and the relationship between the position of the seed tube 22 to with respect to the shank 35 may vary depending on the planter make and model. It has been found, however, that the variances are not significant among the different models of Deere planters nor between Deere planters and Kinze planters.

Accordingly, to provide a single universal bracket assembly capable of use with most, if not all Deere and Kinze planters, arm shims 1050 and stop shims 1052 are provided as part of the forward shank-engaging mount 1024. The stop shims 1052 are placed over the stop 1036 and the arm shims 1050 cooperate with the distal end of the arm 1040. The shims 1050, 1052 accommodate any dimensional tolerances, or differences in shank configuration or shank positions of the planters, while ensuring the bracket 1000 is firmly secured in position.

Figure 20:
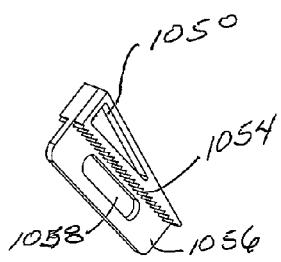
FIG. 20 is a perspective view of one embodiment of a forward shim for use with the bracket assembly of FIGS. 15 and/or 16.
Figure 21:
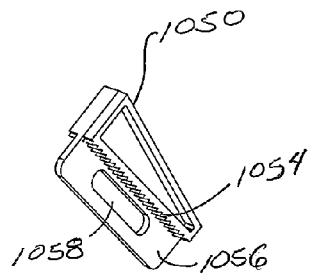
FIG. 21 is a perspective view of another embodiment of a forward shim for use with the bracket assembly of FIGS. 15 and/or 16.
Figure 22:
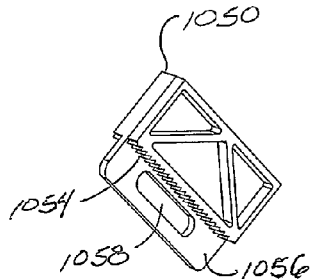
FIG. 22 is a perspective view of another embodiment of a forward shim for use with the bracket assembly of FIGS. 15 and/or 16.

FIGS. 20, 21 and 22 illustrate various arm shims 1050 configured for use with the various planter makes and models. For example, FIG. 20 illustrates an arm shim 1050 that has been found to be suitable for use with Deere planter models 7000, 7200 1700 and Kinze model 2000 planters on which the bracket 1000 is installed. FIG. 21 illustrates an arm shim 1052 that has been found to be suitable for use with Deere XP series planters. FIG. 22 illustrates an arm shim 1050 that has been found suitable for use with Kinze 3000 series planters. It should be appreciated that other arm shim shapes and configurations may be equally suitable. Likewise other shapes and configurations may be equally suitable for the stop shim 1052.

In the preferred embodiment, the arm shims 1050 include a stepped or toothed forward edge 1054. The arm shims 1050 also preferably include a forward projecting flange 1056 having an elongated aperture 1058 therein. The flange 1056 is preferably thinner than the forward toothed edge 1054. When the bracket 1000 is assembled, a fastener 1060 (FIGS. 19, 23) extends through mating apertures 1062 in the distal ends of the arms 1040 and through the elongated aperture 1058 in the shim flange 1056, thereby securing the arm shim 1050 therebetween. The forward toothed edge 1054 of the arm shim 1050 and the rearward toothed edge of the distal end of the arm 1040 cooperate to lock the arm shim 1050 with respect to the arm 1040 in a desired position. To move the arm shim 1050 with respect to the arm 1040, the fastener 1060 is loosened to allow the arm shim 1050 to be vertically movable along the length of the elongated aperture 1058. The stop shim 1052 may be added or removed as necessary to provide a tighter or more secure fit of the bracket 1000 to the shank 35.

As previously discussed, for White planters, due to space limitations and the position of the seed tube 22 with respect to the shank 35, the forward shank-engaging mount 1024 is cut or clipped from the housing 1012 as illustrated in FIG. 17. Thus, with White planters, the bracket 1000 is secured in position using the shaft mount 1020 and the rearward shank-engaging mount 1026. The lobes 1028 of the rearward shank-engaging mount 1026 engage the spacer pin 1029 disposed in the rearward gusset 1030 of the shank 35.

Although only certain exemplary embodiments of the applicants' present invention have been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A bracket assembly for supporting seed planting appurtenances in substantial alignment with respect to a seed tube of an agricultural planter, wherein the planter includes a shank portion supporting an opening disc shaft, the seed tube disposed rearwardly of the shaft, said bracket assembly comprising:
   a shaft mount;
   a shank mount;
   a housing having sides spaced to receive a portion of the seed tube therebetween, said housing further including walls defining a cavity in substantial alignment with respect to the seed tube for receiving a resilient tool such that an upper end of said resilient tool is receivably supported in said cavity and wherein a lower end of said resilient tool is disposed rearwardly and in substantial alignment with respect to the seed tube, and wherein said walls further define a passageway through at least a portion of said housing for receiving a liquid conduit.

2. The bracket assembly of claim 1 further including a support arm having first and second ends, said first end operably supported by said housing, said second end extending rearwardly of said first end and in substantial alignment with the seed tube, said second end having a fitting to support one end of a conduit.

3. The bracket assembly of claim 1 wherein said shaft mount includes a pair of metal ears between which the seed tube is receivable, each of said metal ears having an opening sufficient to receive the opening disc shaft.

4. The bracket assembly of claim 1 wherein said shank mount engages a forward edge of the shank.

5. The bracket assembly of claim 4 wherein said forward shank-engaging mount includes arm members that extended forwardly along each side of the shank and are operably joined at a distal end forward of said forward edge of the shank.

6. The bracket assembly of claim 5 wherein said forward shank-engaging mount further includes forward shims, adjustably moveable with respect to said forwardly extending arms, said forward shims engaging said forward edge of the shank.

7. The bracket assembly of claim 6 wherein said forward shims are selectively lockably engageable with said joined distal end of said forwardly extending arm.

8. The bracket assembly of claim 1 wherein said shank mount engages a portion of the shank disposed rearwardly of the seed tube and in substantial alignment therewith.

9. A bracket for attachment to an agricultural planter to support a resilient tool and a liquid conduit, wherein the planter includes a seed tube and shank supporting an opening disk shaft forward of the seed tube, the bracket comprising:
   a housing having an attached shaft mount portion to receiving the opening disk shaft, said housing further having an integrated shank mount mountable to the shank, said housing further having a passageway through at least a portion thereof to receive and support a liquid conduit therein, said housing further having a resilient tool support for holding and supporting the resilient tool in substantial alignment with the seed tube.

10. The bracket of claim 9 wherein the shank mount includes an alternatively usable forward shank-engaging mount and rearward shank-engaging mount, wherein the forward shank-engaging mount is usable when attaching the bracket to a portion of the shank disposed forward of the opening disk shaft and the rearward shank-engaging mount is usable when attaching the bracket to a portion of the shank disposed rearward of the opening disk shaft.

11. The bracket of claim 10 wherein the rearward shank-engaging mount includes a recess configured to receive a mounting pin.

12. The bracket of claim 10 wherein the forward shank-engaging mount includes arms extending forwardly of the shank, and a shim which cooperates with said forwardly extending arms to rigidly secure said bracket to said shank.

13. The bracket of claim 12 wherein the forward shank-engaging mount is selectively removable.

* * * * *